United States Patent
Lu et al.

(10) Patent No.: US 9,510,287 B2
(45) Date of Patent: Nov. 29, 2016

(54) WIRELESS DEVICE, A RADIO NETWORK NODE AND METHODS FOR DISCONTINUOUS RECEPTION IN DEVICE TO DEVICE COMMUNICATIONS

(71) Applicant: Telefonaktiebolaget L M Ericsson (publ), Stockholm (SE)

(72) Inventors: Qianxi Lu, Beijing (CN); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 154 days.

(21) Appl. No.: 14/388,760

(22) PCT Filed: Dec. 10, 2012

(86) PCT No.: PCT/SE2012/051370
§ 371 (c)(1),
(2) Date: Sep. 26, 2014

(87) PCT Pub. No.: WO2014/092612
PCT Pub. Date: Jun. 19, 2014

(65) Prior Publication Data
US 2015/0055532 A1 Feb. 26, 2015

(51) Int. Cl.
*G08C 17/00* (2006.01)
*H04W 52/02* (2009.01)
(Continued)

(52) U.S. Cl.
CPC ....... *H04W 52/0225* (2013.01); *H04W 76/043* (2013.01); *H04W 76/048* (2013.01); *H04W 76/023* (2013.01)

(58) Field of Classification Search
CPC .................................................. H04W 76/048
See application file for complete search history.

(56) References Cited

U.S. PATENT DOCUMENTS

2009/0316593 A1* 12/2009 Wang ................ H04W 74/0833
370/252
2011/0237231 A1* 9/2011 Horneman .......... H04W 76/048
455/414.1

(Continued)

FOREIGN PATENT DOCUMENTS

| JP | 2012522456 A | 9/2012 |
| WO | 2011116017 A1 | 9/2011 |

OTHER PUBLICATIONS

PCT Notification of Transmittal of International Search Report and the Written Opinion of the International Searching Authority for the Counterpart International Application No. PCT/SE2012/051370, (Sep. 5, 2013), 10 pages.

(Continued)

*Primary Examiner* — Jason Mattis
*Assistant Examiner* — Kevin Cunningham
(74) *Attorney, Agent, or Firm* — NDWE LLP

(57) ABSTRACT

A wireless device and a method for controlling Discontinuous Reception (DRX) in the wireless device. The wireless device is capable of cellular and Device to Device (D2D) communication. The method comprises: in response to receiving a first uplink cellular communication grant, activating, for a first period of time (t1), a DRX-wake state for a cellular DRX configuration during which DRX-wake state the wireless device is configured to receive a second uplink cellular communication grant, and in response to receiving a first D2D communication grant, activating, for a second period of time (t2), the DRX-wake state for a D2D DRX configuration, wherein the D2D DRX configuration is separate from the cellular DRX configuration, and during which DRX-wake state the wireless device is configured to receive a second D2D communication grant. Thereby the wireless device is capable of controlling DRX using both the cellular DRX configuration and the D2D DRX configuration.

36 Claims, 7 Drawing Sheets

(51) Int. Cl.
*H04W 76/04* (2009.01)
*H04W 76/02* (2009.01)

(56) References Cited

U.S. PATENT DOCUMENTS

2011/0268004 A1   11/2011  Doppler et al.
2012/0327913 A1*  12/2012  Wang ............... H04W 72/1215
                                                  370/336

OTHER PUBLICATIONS

3GPP TS 36.211 V11.0.0, "Evolved Universal Terrestrial Radio Access (E-UTRA); Physical Channels and Modulation", *3rd Generation Partnership Project, Technical Specification Group Radio Access Network,* (*Release 11*), (Sep. 2012), 106 pages.

3GPP TS 36.212 V11.0.0, "Evolved Universal Terrestrial Radio Access (E-UTRA); Multiplexing and channel coding", *3rd Generation Partnership Project, Technical Specification Group Radio Access Network,* (*Release 11*), (Sep. 2012), 79 pages.

3GPP TS 36.321 V11.0.0, "Evolved Universal Terrestrial Radio Access (E-UTRA); Medium Access Control (MAC) protocol specification", *3rd Generation Partnership Project, Technical Specification Group Radio Access Network,* (*Release 11*), (Sep. 2012) 55 pages.

3GPP TS 36.331 V11.0.0, "Evolved Universal Terrestrial Radio Access (E-UTRA); Radio Resource Control (RRC); Protocol specification", *3rd Generation Partnership Project, Technical Specification Group Radio Access Network,* (*Release 11*), (Sep. 2012) 325 pages.

International Preliminary Report on Patentability, Application No. PCT/SE2012/051370, dated Jun. 25, 2015, 8 pages.

Decision to Grant, JP Application No. 2015-546423, dated Apr. 26, 2016, 3 pages.

3GPP TR 22.803, "3rd Generation Partnership Project; Technical Specification Group SA; Feasibility Study for Proximity Services (ProSe) (Release 12)," V1.0.0, Aug. 2012, 33 pages, 3GPP Organizational Partners.

Communication under Rule 71(3) EPC from Counterpart European Patent Application No. 12810441.1, mailed Jul. 21, 2016, 108 pages.

Decision to Grant a Counterpart European Patent Application No. 12810441.1, mailed Oct. 7, 2016, 2 pages.

* cited by examiner

WIRELESS DEVICE, A RADIO NETWORK NODE AND METHODS FOR DISCONTINUOUS RECEPTION IN DEVICE TO DEVICE COMMUNICATIONS

CROSS-REFERENCE TO RELATED APPLICATIONS

This application is a National stage of International Application No. PCT/SE2012/051370, filed Dec. 10, 2012, which is hereby incorporated by reference.

TECHNICAL FIELD

Embodiments herein relate to a wireless device, a radio network node and methods therein. In particular, embodiments herein relate to controlling Discontinuous Reception (DRX) in the wireless device.

BACKGROUND

Communication devices such as wireless devices are enabled to communicate wirelessly in a radio communications system, sometimes also referred to as a radio communications network, a mobile communication system, a wireless communications network, a wireless communication system, a cellular radio system or a cellular system. The communication may be performed e.g. between two wireless devices, between a wireless device and a regular telephone and/or between a wireless device and a server via a Radio Access Network (RAN) and possibly one or more core networks, comprised within the wireless communications network.

Wireless devices are also known as e.g. User Equipments (UEs), mobile terminals, wireless terminals and/or mobile stations, mobile telephones, cellular telephones, or laptops with wireless capability, just to mention some examples. The wireless devices in the present context may be, for example, portable, pocket-storable, hand-held, computer-comprised, or vehicle-mounted mobile devices, enabled to communicate voice and/or data, via the RAN, with another entity.

The wireless communications network covers a geographical area which is divided into cell areas, wherein each cell area being served by a network node such as a Base Station (BS), e.g. a Radio Base Station (RBS), which sometimes may be referred to as e.g. eNB, eNodeB, NodeB, or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several radio access and communication technologies. The base stations communicate over the radio interface operating on radio frequencies with the user equipments within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In the context of this disclosure, the expression Downlink (DL) is used for the transmission path from the base station to the wireless device. The expression Uplink (UL) is used for the transmission path in the opposite direction i.e. from wireless device to the base station.

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

According to 3GPP/GERAN, a user equipment has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

Recent developments of the 3GPP Long Term Evolution (LTE) facilitate accessing local Internet Protocol (IP) based services in a home, an office, a public hot spot or even in outdoor environments. One of the important use cases for the local IP access and local connectivity involves direct communication between wireless devices arranged in close proximity of each other. By the expression "close proximity" is herein meant that the wireless devices are arranged less than a few tenths of meters from each other. However, sometimes the wireless devices may be arranged up to a few hundred meters from each other. Thus, the expression "close proximity" may mean that the wireless devices are arranged in the interval from less than a few tenths of meters up to a few hundred meters from each other.

When arranged in close proximity of each other, the two wireless devices may communicate directly with each other without interaction with a cellular access point, such as a base station. This is referred to as a direct mode communication or a device-to-device (D2D) communication, and the two wireless devices capable of D2D communication may be referred to as e.g. D2D devices, D2D capable devices and/or D2D capable wireless devices.

SUMMARY

An object of embodiments herein is to provide a way of improving the performance in a communications network.

According to a first aspect of embodiments herein, the object is achieved by a method in a wireless device for controlling Discontinuous Reception (DRX) in the wireless device. The wireless device is capable of cellular communication and Device to Device (D2D) communication. Further, the wireless device is served by a radio network node. The wireless device and the radio network node are comprised in a communications network configured for both cellular communication and D2D communication.

When a first uplink cellular communication grant is received, the wireless device activates, for a first period of time, t1, a DRX-wake state for a cellular DRX configuration during which DRX-wake state the wireless device is configured to receive a second uplink cellular communication grant.

Further, when a first D2D communication grant is received, the wireless device activates, for a second period of time, t2, the DRX-wake state for a D2D DRX configuration. The D2D DRX configuration is separate from the cellular DRX configuration, and the wireless device is configured to receive a second D2D communication grant during the DRX-wake state.

Thereby, the wireless device is capable of controlling DRX using both the cellular DRX configuration and the D2D DRX configuration.

According to a second aspect of embodiments herein, the object is achieved by a wireless device for controlling Discontinuous Reception (DRX) in the wireless device. The wireless device is capable of cellular communication and Device to Device (D2D) communication. Further, the wireless device is served by a radio network node, and the wireless device and the radio network node are comprised in a communications network configured for both cellular communication and D2D communication.

The wireless device comprises an activating circuit configured to activate, for a first period of time, t1, a DRX-wake state for a cellular DRX configuration when a first uplink cellular communication grant is received. Further, the wireless device is configured to receive a second uplink cellular communication grant during the DRX-wake state.

The activating circuit is further configured to activate, for a second period of time, t2, the DRX-wake state for a D2D DRX configuration when a first D2D communication grant is received. The D2D DRX configuration is separate from the cellular DRX configuration, and the wireless device is configured to receive a second D2D communication grant during the DRX-wake state.

Thereby, the wireless device is capable of controlling DRX using both the cellular DRX configuration and the D2D DRX configuration.

According to a third aspect of embodiments herein, the object is achieved by a method in a radio network node for controlling Discontinuous Reception (DRX) in a wireless device. The wireless device is capable of cellular communication and Device to Device (D2D) communication. Further, the radio network node and the wireless device are comprised in a communications network configured for both cellular communication and D2D communication.

The radio network node transmits a first uplink cellular communication grant to the wireless device, which first uplink cellular communication grant activates the wireless device to become in a DRX-wake state for a cellular DRX configuration for a first period of time, t1. Thereby, the wireless device is configured to receive a second uplink cellular communication grant during the DRX-wake.

Further, the radio network node transmits a first D2D communication grant to the wireless device, which first D2D communication grant activates the wireless device to become in a DRX-wake state for a D2D DRX configuration for a second period of time, t2, which D2D DRX configuration is separate from the cellular DRX configuration, and whereby, the wireless device is configured to receive a second D2D communication grant during the DRX-wake state.

Thereby, the wireless device is capable of controlling DRX using both the cellular DRX configuration and the D2D DRX configuration.

According to a fourth aspect of embodiments herein, the object is achieved by a radio network node for controlling Discontinuous Reception (DRX) in a wireless device. The wireless device is capable of cellular communication and Device to Device (D2D) communication. Further, the radio network node and the wireless device are comprised in a communications network configured for both cellular communication and D2D communication.

The radio network node comprises a transmitting circuit configured to transmit a first uplink cellular communication grant to the wireless device, which first uplink cellular communication grant activates the wireless device to become in a DRX-wake state for a cellular DRX configuration for a first period of time, t1. Thereby, the wireless device is configured to receive a second uplink cellular communication grant during the DRX-wake state.

Further, the transmitting circuit is configured to transmit a first D2D communication grant to the wireless device. The first D2D communication grant activates the wireless device to become in a DRX-wake state for a D2D DRX configuration for a second period of time, t2, which D2D DRX configuration is separate from the cellular DRX configuration, and whereby, the wireless device is configured to receive a second D2D communication grant during the DRX-wake state.

Thereby, the wireless device is capable of controlling DRX using both the cellular DRX configuration and the D2D DRX configuration.

Since the cellular DRX configuration and the D2D DRX configuration is separate from each other, the flexibility in configuring the DRX configurations for the cellular communication and the D2D communications, respectively, is improved. Thereby, different traffic characteristic between cellular communication and D2D communication may be taken into account. This results in an improved performance in the communications network.

An advantage of embodiments herein is that the configurable coupling relationship between the cellular DRX configuration and the D2D DRX configuration may help the communications network to reduce the delay when waiting for a cellular-wake interval for a cellular mode scheduling. For example, in some cases, the communications network, e.g. a radio network node, may want to schedule two wireless devices in a cellular mode just after they have been scheduled in a D2D mode. For example, this may be the case because control plane data carried by a cellular connection is closely coupled with user plane data carried by a D2D connection. Therefore, it may be beneficial that the cellular DRX mode may be awake soon after the D2D scheduling in order to carry the control plane data. If this was not the case, the delay due to the waiting for the DRX wake state may introduce delay to all traffic in the communications network, and therefore may cause performance degradation in the communications network.

BRIEF DESCRIPTION OF THE DRAWINGS

Examples of embodiments herein are described in more detail with reference to attached drawings in which.

DETAILED DESCRIPTION

Figure 1A:
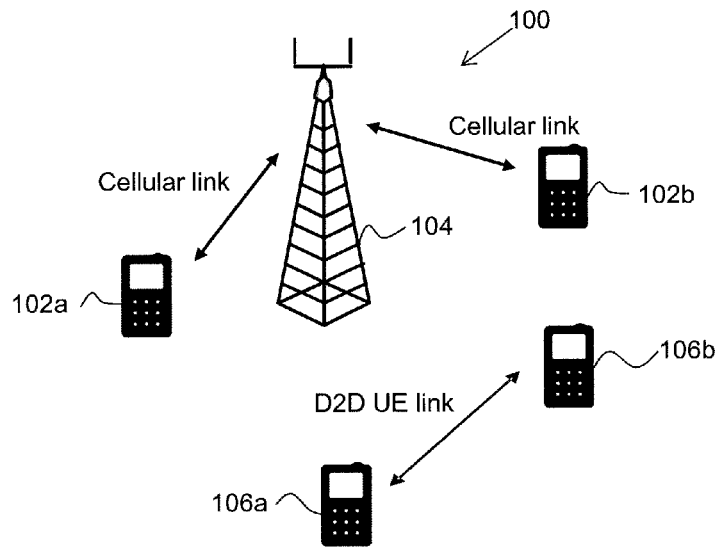
FIG. 1A is a schematic block diagram illustrating some embodiments of a communications network.

Embodiments herein will be exemplified in the following non-limiting description.

As part of developing embodiments herein, a problem will first be identified and discussed.

According to the current LTE specification (3GPP TS 36.321 E-UTRA Medium Access Control (MAC) protocol specification), in order to implement power saving in a wireless device, the scheduling information delivery, i.e., the monitoring on Cell Radio Network Temporary Identifier (C-RNTI), is coupled with a Discontinuous Reception (DRX). That is, only when the wireless device is awake according to the DRX criterion, a communication network, .e.g. a radio network node, has a chance to schedule the wireless device and the wireless device would try to decode a Physical Downlink Control Channel (PDCCH) for possible scheduling grant.

The C-RNTI is a wireless device identifier allocated by the radio network node, e.g. an eNodeB, and it is unique within one cell controlled by that radio network node. The C-RNTI may be reallocated when a wireless device moves to a new cell, see e.g. 3GPP TS36.321 Section 7.1.

Further, the PDCCH is a downlink control channel used to support efficient data transmission in LTE. A PDCCH carries a message known as Downlink Control Information (DCI), which comprises transmission resource assignments and other control information for a wireless device or group of wireless devices. Many PDCCHs may be transmitted in a subframe, see e.g. 3GPP TS36.212 Section 5.3.3 and TS36.211 Section 6.8.

The standard specifications 3GPP TS 36.331 E-UTRA, Radio Resource Control (RRC), http://www.3gpp.org/ftp/Specs/html-info/36331.htm, and 3GPPTS 36.321 E-UTRA; Medium Access Control (MAC), http://www.3gpp.org/ftp/Specs/html-info/36321.htm specify procedures for DRX. The wireless device may for lengthy and reoccurring periods disable its receiver and just discontinuously monitor the downlink channels during short phases. Evolved UTRAN Discontinuous reception (E-UTRAN DRX) may be characterized by the following:

1) Short on-duration phases in which data transfer may start. The wireless device will monitor the control channel in this phase. The wireless device may turn off its receiver and enter a low energy state if data does not occur. Whenever the wireless device detects data during its on-duration reception of a Downlink Synchronization Channel (DL-SCH), it may extend a DRX-active period. This may be performed by starting one or more timers, such as an inactivityTimer and a shortCycleTimer, aiming to extend the active-time, i.e. to extend the DRX-active period.

2) Periodic repetition of a short on-duration phase followed by a possible period of an inactive period, e.g. a DRX-inactive period.

3) The lengths of an on-duration of e.g. the one or more timers, i.e. the inactivityTimer and the shortCycleTimer, are fixed by the RRC configuration of the wireless device, while the active-time is of varying lengths instantaneously based on scheduling decisions.

4) When a Scheduling Request (SR) is sent on a Physical Uplink Control Channel (PUCCH) and is pending, the wireless device keeps active to wait for UL grant.

In LTE, the PUCCH is an uplink physical channel carrying uplink control information including Channel Quality Indicators (CQI), Hybrid Automatic Retransmission reQuest (HARQ), ACKnowledgment (ACK), Negative ACKnowledgment (NACK) and uplink scheduling requests, see e.g. 3GPP TS36.211 Section 5.4.

A mixed cellular and D2D communications network will for each D2D capable wireless device support both cellular communication and D2D communication on cellular resources. For both types of communication, the resource allocation is decided by the communications network, e.g. by a radio network node comprised in the communication network. In other words, the D2D capable wireless devices have to monitor PDCCH for scheduling information of both cellular mode communication and D2D mode communication. Specifically, for a specific D2D wireless device pair, i.e., for a transmitting D2D capable wireless device (D2D Tx), and a receiving D2D capable wireless device (D2D Rx), on the one hand, they both have to monitor PDCCH in discontinuous way, for possible PDSCH/PUSCH scheduling for traditional cellular link communication. On the other hand, when there is D2D data to send from the D2D Tx, the D2D Tx could send a scheduling request in a 3GPP LTE system, to the communications network, e.g. to the radio network node, in order to request resource allocation. The communications network, e.g. the radio network node, may then schedule the D2D transmission by transmitting on the PDCCH. Therefore, the D2D Rx also has to monitor PDCCH for possible D2D scheduling. It should be understood that the D2D wireless devices may be both transmitting D2D devices and receiving D2D devices, so both D2D wireless devices have to monitor PDCCH in a discontinuous way to save power. However, in the prior art there is no solution on how the dual mode communication should interact with a discontinuous reception configuration.

Furthermore, since the data transmission on a D2D communication link would be supported by a cellular communication link it would be possible that activity on the D2D communication link may trigger the activity on the cellular UL communication link and/or the cellular DL communication link. However, in the prior art there is no solution on how the DRX mechanism should handle this interaction between the two communication modes. Therefore, some embodiments herein aim to provide a solution to this problem, i.e., how to design the DRX configuration for the mixed communications network scenario.

Some examples of data transmission on the D2D communication link that may be supported by the cellular communication link are a Buffer Status Report (BSR) and/or a Power Headroom Report (PHR) or a combination hereof to the radio network node via an uplink connection, and Control Plane (CP) data such as Non-Access Stratum (NAS) signaling, RRC signaling, Session Initiated Protocol (SIP)

signaling, Real-Time Transport Protocol (RTCP) signaling, via a cellular DL/UL connection.

Some embodiments herein solve the problem by providing two separate DRX configurations and settings for each D2D capable wireless device. In some embodiment, for each D2D capable wireless device, a cellular DRX configuration is provided for cellular scheduling and a D2D DRX configuration is provided for D2D scheduling.

Further, in some embodiments which will be described in more detail below, the two DRX configurations are filtered by a first subframe configuration e.g. a cellular dedicated subframe configuration, and/or a second subframe configuration, e.g. a D2D dedicated subframe configuration.

Furthermore, in some embodiments which will be described in more detail below, a D2D scheduling request may not trigger an extra active period of time.

Yet further, in some embodiments which will be described in more detail below, it is configurable by the communications network, e.g. the radio network node, to control whether the D2D scheduling should trigger monitoring of cellular UL and/or DL scheduling information. For example, in some embodiments, it is configurable by the communications network, e.g. the radio network node, to control whether the D2D scheduling should trigger one or more cellular timers, such as a cellular DRX inactivityTimer and a shortCycleTimer, in order to monitor cellular UL and/or DL scheduling information.

FIG. 1A schematically illustrates a communications network 100 comprising two wireless devices 102a, 102b capable of cellular communication and communicating with each other via a radio network node 104 according to traditional cellular communication techniques. Further, FIG. 1A schematically illustrates two wireless devices 106a, 106b capable of both cellular communication and direct mode communication, e.g. Device-to-Device (D2D) communication. The wireless devices 106a, 106b are comprised in the communications network 100 and may communicate with each other using traditional cellular communication techniques and/or direct mode communications techniques.

The communications network 100 is sometimes referred to as a mixed communications network since it provides for communication using both traditional cellular communication techniques and direct mode communications techniques. The communications network 100 may be a 3GPP communications system or a non-3GPP communications system. Further, the communications network 100 may comprises one or more of radio communications networks (not shown). Each radio communications network may be configured to support one or more Radio Access Technologies (RATs). Furthermore, the one or more radio communications networks may be configured to support different RATs. Some examples of RATs are GSM, WCDMA, and LTE.

The two wireless devices 102a,102b capable of only cellular communication are sometimes referred to as a first cellular wireless device 102a and a second cellular wireless device 102b, respectively. Further, the two cellular wireless devices 102a, 102b is located within one or more geographical area, sometimes referred to as a cell, and is served by the radio network node 104. Furthermore, the two cellular wireless devices 102a, 102b transmits data over a radio interface to the radio network node 104 in an uplink (UL) transmission and the radio network node 104 transmits data to the two cellular wireless devices 102a, 102b in a downlink (DL) transmission.

The two cellular wireless devices 102a, 102b may be e.g. user equipments such as mobile terminals or wireless terminals, mobile phones, computers such as e.g. laptops, tablet pc's, Personal Digital Assistants (PDA), or any other radio network units capable to communicate over a radio link in a cellular communications network. The two cellular wireless devices 102a, 102b may further be configured for use in both a 3GPP network and in a non-3GPP network.

It should be understood that the wireless device 102a, 102b capable of cellular communication are so called legacy wireless devices and do only support cellular communications techniques.

The radio network node 104 may be a base station such as an eNB, an eNodeB, Node B or a Home Node B, a Home eNode B, a radio network controller, a base station controller, an access point, a relay node which may be fixed or movable, a donor node serving a relay, a GSM/EDGE radio base station, a Multi-Standard Radio (MSR) base station or any other network unit capable to serve a wireless device or another radio network node comprised in the communications network 100.

The two wireless devices 106a,106b capable of both cellular communication and D2D communication are sometimes referred to as a first D2D wireless device 106a and a second D2D wireless device 106b, respectively. Further, the two D2D wireless devices 106a, 106b may be e.g. user equipments such as mobile terminals or wireless terminals, mobile phones, computers such as e.g. laptops, tablet pc's, Personal Digital Assistants (PDA), or any other radio network units capable to communicate over a radio link in the communications network 100. The two D2D wireless devices 106a, 106b may further be configured for use in both a 3GPP network and in a non-3GPP network.

Further, the two D2D wireless devices 106a, 106b is located within one or more geographical area, sometimes referred to as a cell, and is served by the radio network node 104. Further, two D2D wireless devices 106a, 106b transmit data over a radio interface to the radio network node 104 in an uplink (UL) transmission and the radio network node 104 transmits data to the two wireless devices 106a, 106b in a downlink (DL) transmission.

It should be understood that the wireless devices 106a, 106b capable of both cellular communication and D2D communication support both cellular communications techniques and direct mode communications techniques.

The direct mode communication enables a number of potential gains over the traditional cellular communications technique, because the D2D wireless devices 106a, 106b are arranged much closer to each than the cellular wireless devices 102a, 102b that have to communicate via the cellular access point, e.g., radio network node 104. Some examples of potential gains by using direct mode communication instead of traditional cellular communications are capacity gain, peak rate gain, and latency gain.

When considering the capacity gain, firstly, radio resources, e.g. OFDM resource blocks, between the D2D layer and the cellular layers may be reused. This may be referred to as reuse gain. Secondly, a D2D link uses a single hop between a transmitter, i.e., a transmitting D2D wireless device, e.g. the D2D wireless device 106a, and a receiver, i.e. a receiving D2D wireless device, e.g. the D2D wireless device 106b, as opposed to the two-hop link via a cellular Access Point (AP) when two cellular devices 102a, 102b are communicating with each other. This may be referred to as hop gain.

Further, when considering the peak rate gain, high peak rates may be achieved due to the proximity and potentially favourable propagation conditions. This may be referred to as proximity gain.

Furthermore, when considering the latency gain, when the wireless devices communicate over a direct mode communication link instead of a traditional cellular communication link, the forwarding performed by the radio network node is short cut and the end-to-end latency may thus decrease.

Figure 1B:
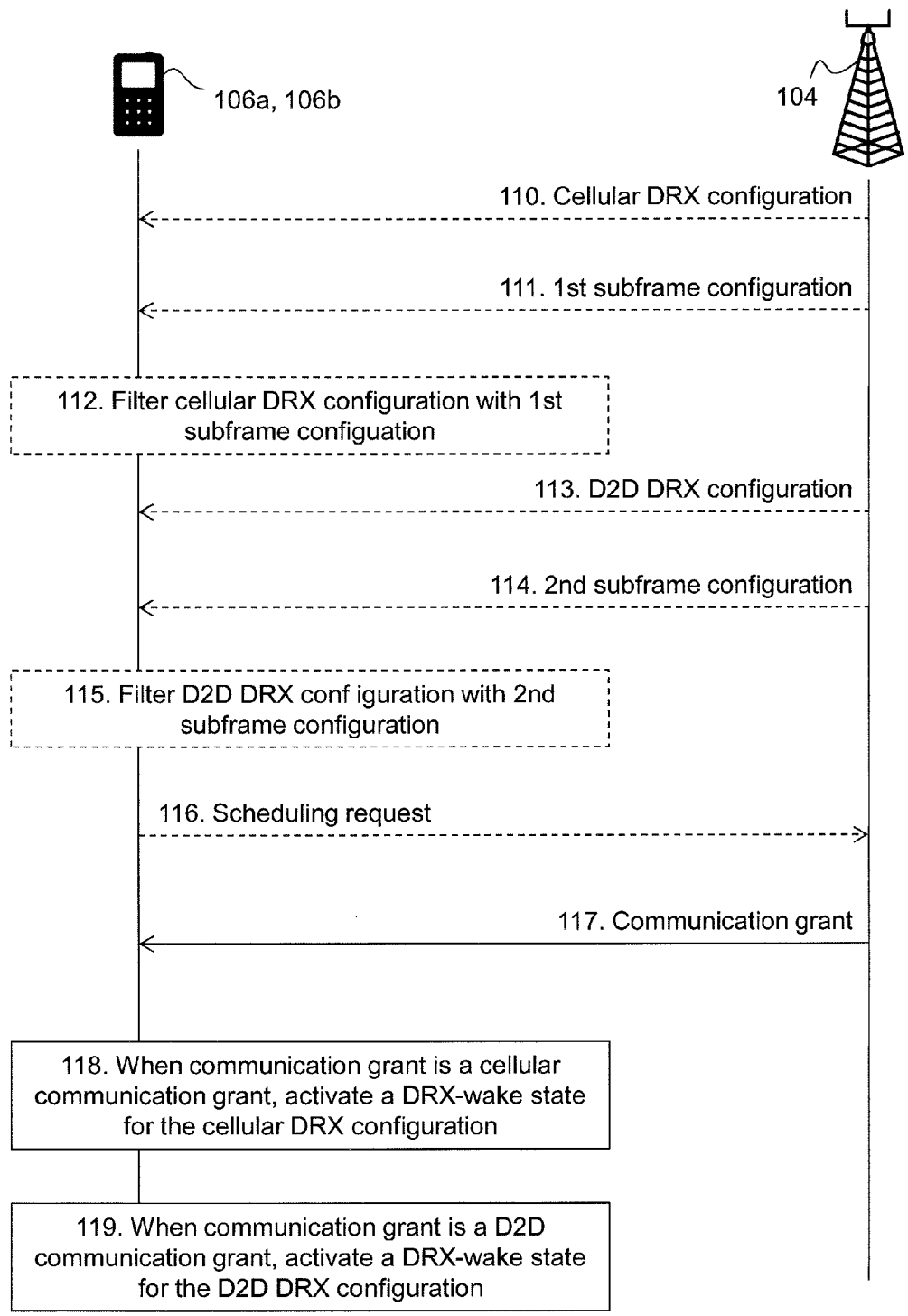
FIG. 1B is a schematic combined flowchart and signalling scheme of embodiments of a communications network.

FIG. 1B is a schematic combined flowchart and signalling scheme for controlling Discontinuous Reception (DRX) in the wireless device 106a,106b.

Actions for controlling Discontinuous Reception (DRX) in the wireless device 106a, 106b will now be described with reference to FIG. 1B. As previously mentioned, the wireless device 106a, 106b is capable of cellular communication and Device to Device (D2D) communication. Further, the wireless device 106a,106b is served by the radio network node 104. The wireless device 106a, 106b and the radio network node 104 are comprised in the communications network 100, which communications network 100 is configured for both cellular communication and D2D communication. Further, by means of actions described in some embodiments herein the wireless device 106a, 106b is capable of controlling DRX using both a cellular DRX configuration and a D2D DRX configuration.

The actions do not have to be performed in the order stated below, but may be taken in any suitable order. Further, actions may be combined.

Action 110

In order to give the wireless device 106a,106b knowledge about e.g. subframes in which the wireless device 106a, 106b should be capable of receiving cellular scheduling information from the radio network node 104, the radio network node 104 may transmit the cellular DRX configuration to the wireless device 106a, 106b.

The cellular DRX configuration may be sent from the radio network node 104 to the wireless device 106a,106b via Radio Resource Control (RCC) signalling.

As will be described below, the cellular DRX configuration may comprise a set of subframes, in which subframes the wireless device 106a, 106b is either capable of receiving cellular scheduling information or not capable of receiving cellular scheduling information.

Action 111

In some embodiments, it may be desirable to e.g. change subframes in which the wireless device 106a, 106b should not be capable of receiving cellular scheduling information from the radio network node 104. In such embodiments, the radio network node 104 may transmit a first subframe configuration to the wireless device 106a, 106b.

The first subframe configuration may be sent from the radio network node 104 to the wireless device 106a,106b via Downlink Control Indicator (DCI), MAC Control Element (CE), or RRC signalling.

As will be described in more detail below, the first subframe configuration may comprise a set of subframes for which cellular communication should not be allowed.

Action 112

In some embodiments, when the wireless device 106a, 106b has received the first subframe configuration from the radio network node 104, the wireless device 106a, 106b may filter the cellular DRX configuration with the first subframe configuration.

As will be described in more detail below, by filtering the cellular DRX configuration with the first subframe configuration, the wireless device 106a, 106b may be in a DRX-sleep state for cellular communication for subframes comprised in the first subframe configuration.

Action 113

In order to give the wireless device 106a,106b knowledge about e.g. subframes in which the wireless device 106a, 106b should be capable of receiving D2D scheduling information from the radio network node 104, the radio network node 104 may transmit a D2D DRX configuration to the wireless device 106a, 106b.

The D2D DRX configuration may be sent from the radio network node 104 to the wireless device 106a,106b via DCI, MAC CE, or RRC signalling.

As will be described below, the D2D DRX configuration may comprise a set of subframes, in which subframes the wireless device 106a, 106b is either capable of receiving D2D scheduling information or not capable of receiving D2D scheduling information.

Action 114

In some embodiments, it may be desirable to e.g. change subframes in which the wireless device 106a, 106b should not be capable of receiving D2D scheduling information from the radio network node 104. In such embodiments, the radio network node 104 may transmit a second subframe configuration to the wireless device 106a, 106b.

The second subframe configuration may be sent from the radio network node 104 to the wireless devices via DCI, MAC CE, or RRC signalling.

As will be described in more detail below, the second subframe configuration may comprise a set of subframes for which D2D communication should not be allowed.

Action 115

In some embodiments, when the wireless device 106a, 106b has received the second subframe configuration from the radio network node 104, the wireless device 106a, 106b may filter the D2D DRX configuration with the second subframe configuration. As will be described in more detail below, by filtering the D2D DRX configuration with the second subframe configuration, the wireless device 106a, 106b may be in a DRX-sleep state for D2D communication for subframes comprised in the second subframe configuration.

Action 116

The wireless device 106a, 106b may transmit a scheduling request to the radio network node 104 in order to request one or more resources. The scheduling request may be a scheduling request for cellular communication and/or for D2D communication. In response to the scheduling request the wireless device 106a, 106b may receive a communication grant from the radio network node 104.

The scheduling request may be sent from the wireless device 106a, 106b to the radio network node 104 via Uplink Control Indicator (UPI), MAC CE, or RRC signalling.

Action 117

The radio network node 104 may transmit a communication grant to the wireless device 106a,106b. In some embodiments, the communication grant is transmitted in response to the received scheduling request.

The communication grant may be sent from the radio network node 104 to the wireless device 106a,106b via DCI, MAC CE, or RRC signalling.

The communication grant may be an uplink cellular communication grant or a D2D communication grant.

The uplink cellular communication grant activates the wireless device 106a, 106b to become in a DRX-wake state for the cellular DRX configuration for a first period of time, whereby the wireless device 106a, 106b is configured to receive a second uplink cellular communication grant during the DRX-wake.

The D2D communication grant activates the wireless device 106a, 106b to become in a DRX-wake state for the D2D DRX configuration for a second period of time, whereby the wireless device 106a,106b is configured to receive a second D2D communication grant during the DRX-wake state.

Action 118

When the communication grant is a cellular communication grant, the wireless device 106a, 106b activates a DRX-wake state for the cellular DRX configuration. Thereby the wireless device 106a, 106b is configured to receive a second uplink cellular communication grant during the DRX-wake.

Action 119

When the communication grant is a D2D communication grant, the wireless device 106a, 106b activates a DRX-wake state for the D2D DRX configuration. Thereby, the wireless device 106a, 106b is configured to receive a second D2D communication grant during the DRX-wake state.

Thanks to actions described herein, such as e.g. Actions 118 and 119, the wireless device 106a, 106b is capable of controlling DRX using both the cellular DRX configuration and the D2D DRX configuration.

Actions described above will be described below in more detail from a perspective of the wireless device 106a, 106b.

Figure 2:
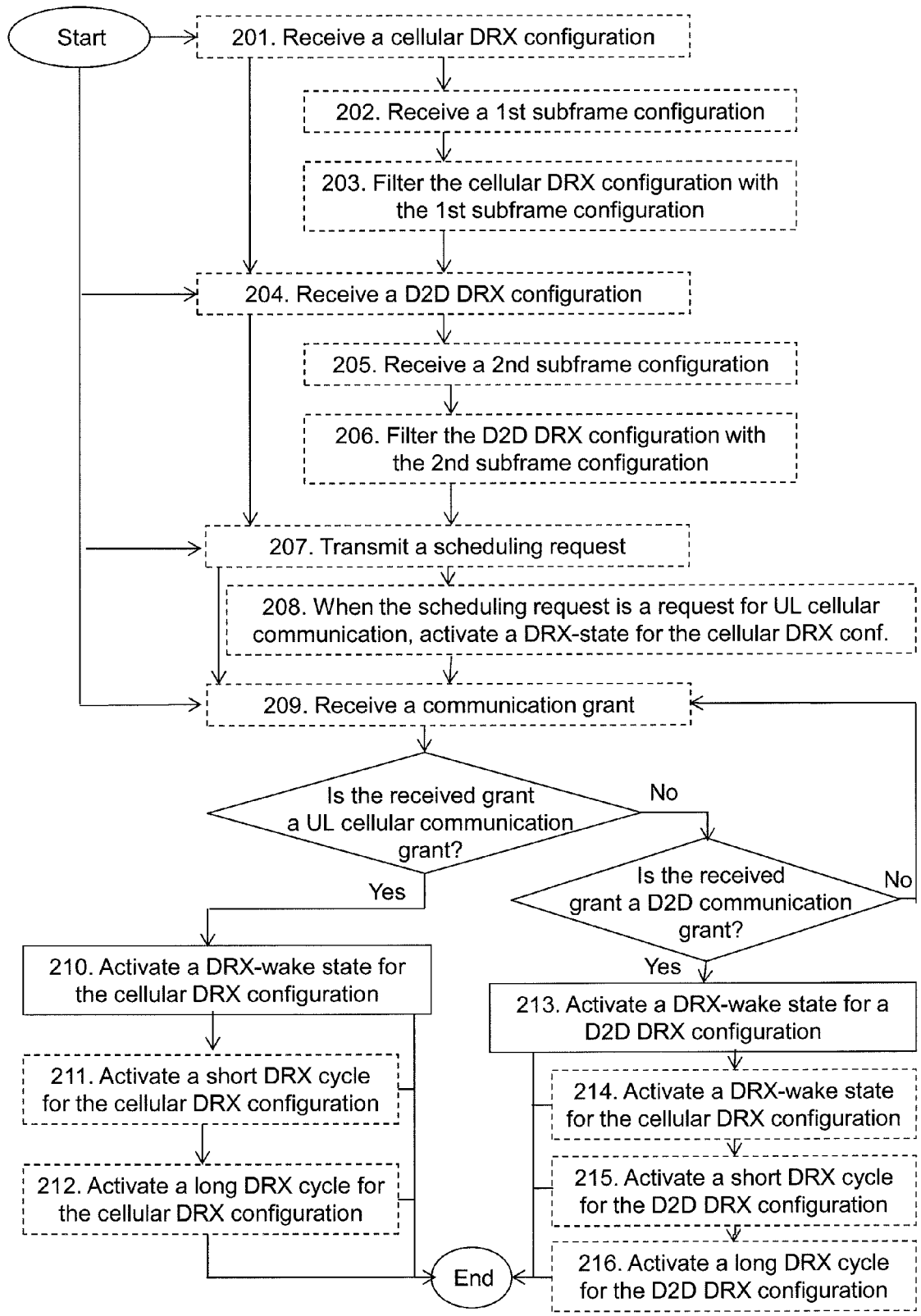
FIG. 2 is a flowchart depicting embodiments of a method in a wireless device.

A method in a wireless device 106a, 106b for controlling Discontinuous Reception (DRX) in the wireless device 106a, 106b will now be with reference to FIG. 2. As previously mentioned, the wireless device 106a, 106b is capable of cellular communication and Device to Device (D2D) communication. Further, the wireless device 106a, 106b is served by the radio network node 104. The wireless device 106a, 106b and the radio network node 104 are comprised in a communications network 100, which communications network 100 is configured for both cellular communication and D2D communication. Further, by means of actions described in some embodiments herein the wireless device 106a, 106b is capable of controlling DRX using both a cellular DRX configuration and a D2D DRX configuration.

The method comprises the following actions, which do not have to be performed in the order stated below, but may be taken in any suitable order. Further, actions may be combined.

Action 201

The wireless device 106a, 106b may receive a cellular DRX configuration for scheduling of cellular communication from the radio network node 104.

The cellular DRX configuration may be sent from the radio network node 104 to the wireless device 106a, 106b via RRC signalling.

The cellular DRX configuration may comprise a set of subframes, which subframes are indicated as cellular DRX-wake subframes or as cellular DRX-sleep subframes. By the expression "cellular DRX-wake subframes" is meant that the wireless device 106a, 106b is capable of receiving cellular scheduling information in those subframes, and by the expression "cellular DRX-sleep subframes" is meant that the wireless device 106a, 106b is not capable of receiving cellular scheduling information in those subframes.

This Action relates to Action 110 described above.

Action 202

The wireless device 106a, 106b may receive a first subframe configuration from the radio network node 104.

The first subframe configuration may be sent from the radio network node 104 to the wireless device 106a, 106b via DCI, MAC CE or RRC signalling.

The first subframe configuration may comprise a set of subframes for which cellular communication should not be allowed, i.e. for which subframes the wireless device 106a, 106b may be a DRX-sleep state for cellular communication.

In some embodiments, the first subframe configuration is a D2D dedicated subframe configuration comprising one or more subframes dedicated for D2D communication, i.e. comprising one or more D2D DRX-wake subframes. As will be described in Action 204, the one or more D2D DRX-wake subframes are subframes in which the wireless device 106a, 106b is capable of receiving a D2D transmission.

This Action relates to Action 111 described above.

Action 203

The wireless device 106a, 106b may filter the cellular DRX configuration with a first subframe configuration. As previously mentioned, the first subframe configuration may comprise subframes for which cellular communication should not be allowed, i.e. for which subframes the wireless device 106a, 106b may be a DRX-sleep state for cellular communication. Thus, by filtering the cellular DRX configuration with the first subframe configuration, the wireless device 106a, 106b may be in the DRX-sleep state for cellular communication for subframes comprised in the first subframe configuration.

This Action relates to Action 112 described above.

The filtering will be described in more detail below with reference to FIG. 10.

Action 204

The wireless device 106a, 106b may receive a D2D DRX configuration for scheduling of D2D communication from the radio network node 104.

The wireless device 106a, 106b may receive the D2D DRX configuration from the radio network node 104 via DCI, MAC CE or RRC signalling.

The D2D DRX configuration may comprise a set of subframes, which subframes are indicated as D2D DRX-wake subframes or as D2D DRX-sleep subframes. By the expression "D2D DRX-wake subframes" is meant that the wireless device 106a, 106b is capable of receiving D2D scheduling information in those subframes, and by the expression "D2D DRX-sleep subframes" is meant that the wireless device 106a, 106b is not capable of receiving D2D scheduling information in those subframes.

This Action relates to Action 113 described above.

Action 205

The wireless device 106a, 106b may receive a second subframe configuration from the radio network node 104.

The wireless device 106a, 106b may receive the second subframe configuration from the radio network node 104 via DCI, MAC CE or RRC signalling.

The second subframe configuration may comprise a set of subframes for which D2D communication should not be allowed, i.e. for which subframes the wireless device 106a, 106b may be in a DRX-sleep state for D2D communication.

In some embodiments, the second subframe configuration is a cellular dedicated subframe configuration comprising one or more subframes dedicated for cellular communication, i.e. comprising one or more cellular DRX-wake subframes.

This Action relates to Action 114 described above.

Action 206

The wireless device 106a, 106b may filter the D2D DRX configuration with a second subframe configuration. As previously mentioned, the second subframe configuration may comprise subframes for which D2D communication should not be allowed, i.e. for which subframes the wireless device 106a, 106b may be a DRX-sleep state for D2D communication. Thus, by filtering the cellular DRX configuration with the second subframe configuration, the wireless device 106a, 106b may be in a DRX-sleep state for D2D communication for subframes comprised in the second subframe configuration.

This Action relates to Action 115 described above.

The filtering will be described in more detail below with reference to FIG. 10.

Action 207

The wireless device 106a, 106b may transmit a scheduling request to the radio network node 104.

The wireless device 106a, 106b may transmit the scheduling request to the radio network node 104 via UCI, MAC CE or RRC signalling.

The scheduling request may be a scheduling request for cellular communication and/or for D2D communication. Thus, the scheduling request may be a cellular scheduling request, a D2D scheduling request or a combined cellular and D2D scheduling request.

This Action relates to Action 116 described above.

Action 208

When the scheduling request comprises a request for an uplink cellular communication, the wireless device 106a, 106b may activate the DRX-wake state for the cellular DRX configuration during which DRX-wake state the wireless device 106a, 106b is configured to receive the first uplink cellular communication grant from the radio network node 104.

The wireless device 106a, 106b may activate the DRX-wake state for the cellular DRX configuration until the wireless device 106a, 106b has received the first uplink cellular communication grant.

In some embodiments, the wireless device 106a, 106b may activate the DRX-wake state for the cellular DRX configuration for a fifth period of time t5. In such embodiments, the wireless device 106a, 106b may activate the DRX-sleep state when the fifth period of time t5 has expired.

Action 209

The wireless device 106a,106b be may receive the first uplink cellular communication grant and/or the first D2D communication grant from the radio network node 104.

The wireless device 106a, 106b may receive the communication grant from the radio network node 104 via DCI, MAC CE or RRC signalling.

As mentioned in Action 207, the wireless device 106a, 106b may transmit a scheduling request to the radio network node 104. In such embodiments, the wireless device 106a, 106 may receive the first uplink cellular communication grant and/or the first D2D communication grant in response to the transmitted scheduling request.

This Action relates to Action 117 described above.

Action 210

When a first uplink cellular communication grant is received, the wireless device 106a,106b activates, for a first period of time t1, a DRX-wake state for a cellular DRX configuration during which DRX-wake state the wireless device 106a,106b is configured to receive a second uplink cellular communication grant.

This Action relates to Action 118 described above.

Action 211

When the first period of time, t1, mentioned in Action 210, is expired, the wireless device 106a, 106b may activate a short DRX cycle $c_{S, cell}$ for the cellular DRX configuration. The short DRX cycle $c_{S, cell}$ may be repeated for a third period of time t3. Further, the short DRX cycle $c_{S, cell}$ may comprise a first number of subframes. Furthermore, the wireless device 106a, 106b is in the DRX-wake state in at least one subframe of the first number of subframes, and the wireless device 106a, 106b is in a DRX-sleep state when not in the DRX-wake state. When the wireless device 106a, 106b is in the DRX-wake state, the wireless device 106a, 106b is configured to receive a second uplink cellular communication grant.

Action 212

When the third period of time, t3, mentioned in Action 211, is expired, the wireless device 106a, 106b may activate a long DRX cycle $c_{L, cell}$ for the cellular DRX configuration. The long DRX cycle $c_{L, cell}$ may comprise a second number of subframes. Further, the second number of subframes is larger than the first number of subframes. Furthermore, the wireless device 106a, 106b is in the DRX-wake state in at least one subframe of the second number of subframes, and in the DRX-sleep state when not in the DRX-wake state. When the wireless device 106a, 106b is in the DRX-wake state, the wireless device 106a, 106b is configured to receive a second uplink cellular communication grant.

Action 213

When a first D2D communication grant is received, the wireless device 106a, 106b activates, for a second period of time t2, the DRX-wake state for a D2D DRX configuration, which D2D DRX configuration is separate from the cellular DRX configuration, and during which DRX-wake state the wireless device 106a, 106b is configured to receive a second D2D communication grant.

By the expression "D2D DRX configuration is separate from the cellular DRX configuration" and similar when used herein is meant that the D2D DRX configuration is a specific or individual DRX configuration for D2D communication and that the cellular DRX configuration is a specific or individual DRX configuration for cellular communication. Further, the D2D DRX configuration may be different from the cellular DRX configuration, but it does not have to be different from the cellular DRX configuration.

This Action relates to Action 119 described above.

Action 214

When the first D2D communication grant is received as described in Action 213 above, the wireless device 106a, 106b activates, for the second period of time t2, the DRX-wake state for the cellular DRX configuration during which DRX-wake state the wireless device 106a, 106b is configured to receive the second cellular communication grant. Thus, a D2D communication grant triggers monitoring of a cellular communication grant.

Action 215

When the second period of time, t2, mentioned in Actions 213 and 214, is expired, the wireless device 106a, 106b activates a short DRX cycle, $c_{S, D2D}$, for the D2D DRX configuration. The short DRX cycle, $c_{S, D2D}$, may be repeated for a fourth period of time, t4. Further, the short DRX cycle, $c_{S, D2D}$, may comprise a first number of subframes. Furthermore, the wireless device 106a, 106b may be in the DRX-wake state in at least one subframe of the first number of subframes and in a DRX-sleep state when not in the DRX-wake state. When the wireless device 106a, 106b is in the DRX-wake state, the wireless device 106a, 106b is configured to receive a second D2D communication grant.

Action 216

When the fourth period of time t4, mentioned in Action 215 is expired, the wireless device 106a, 106b activates a long DRX cycle $c_{L, D2D}$ for the D2D DRX configuration. The long DRX cycle $c_{L, D2D}$ may comprise a second number of subframes, wherein the second number of subframes is larger than the first number of subframes mentioned in Action 215 above. Further, the wireless device 106a, 106b may be in the DRX-wake state in at least one subframe of the second number of subframes and in the DRX-sleep state when not in the DRX-wake state. When the wireless device 106a, 106b is in the DRX-wake state, the wireless device 106a, 106b is configured to receive a second D2D communication grant.

Figure 3:
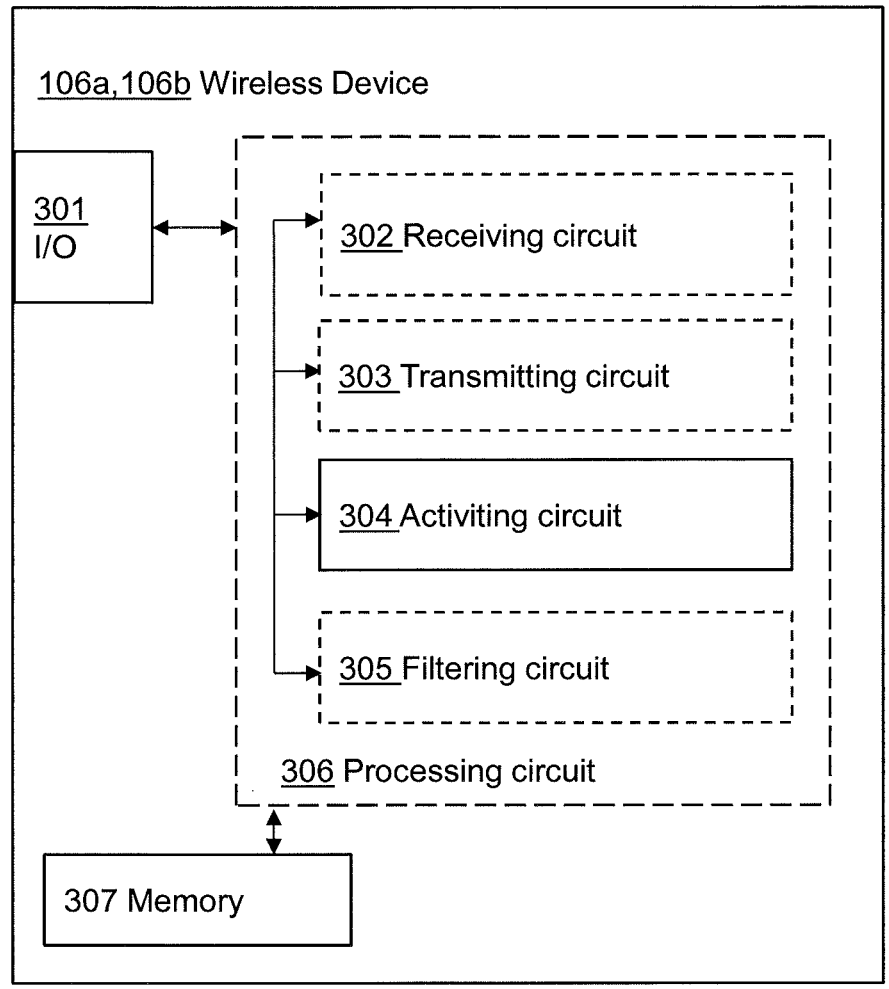
FIG. 3 is a schematic block diagram illustrating embodiments of a wireless device.

To perform the method actions in the wireless device 106a, 106b described above in relation to FIG. 2, the wireless device 106a, 106b may comprise the following arrangement depicted in FIG. 3. As previously mentioned, the wireless device 106a, 106b is capable of cellular communication and Device to Device (D2D) communication. Further, the wireless device 106a,106b is served by the radio network node 104. The wireless device 106a, 106b and the radio network node 104 are comprised in the communications network 100, which communications network 100 is configured for both cellular communication and D2D communication. Further, in some embodiments described herein, the wireless device 106a,106b is capable of controlling DRX using both a cellular DRX configuration and a D2D DRX configuration.

The wireless device 106a,106b comprises an input and output (I/O) interface 301 configured to function as an interface for communication in the communication system 100. The communication may for example be communication with the cellular wireless device 102a, 102b, the radio network node 104, and/or another D2D wireless device 106a, 106b.

The wireless device 106a, 106b may comprise a receiving circuit 302 configured to receive a first uplink cellular communication grant and a first D2D communication grant from the radio network node 104.

The receiving circuit 302 may further be configured to receive from the radio network node 104 a cellular DRX configuration for scheduling of cellular communication and/or a D2D DRX configuration for scheduling of D2D communication.

Further, the wireless device 106a, 106b may comprise a transmitting circuit 303 configured to transmit a scheduling request to the radio network node 104. In some embodiment, the receiving circuit 302 is further configured to receive the first uplink cellular communication grant and the first D2D communication grant in response to the transmitted scheduling request.

The wireless device 106a, 106b comprises an activating circuit 304 configured to activate, for a first period of time t1, a DRX-wake state for a cellular DRX configuration when a first uplink cellular communication grant is received. Further, during the DRX-wake state, the wireless device 106a, 106b is configured to receive a second uplink cellular communication grant.

The activating circuit 304 is furthermore configured to activate, for a second period of time t2, the DRX-wake state for a D2D DRX configuration when a first D2D communication grant is received. The D2D DRX configuration is separate from the cellular DRX configuration. Further, during the DRX-wake state the wireless device 106a,106b is configured to receive a second D2D communication grant.

In some embodiments, when the first D2D communication grant is received, the activating circuit 304 is further configured to activate, for the second period of time t2, the DRX-wake state for the cellular DRX configuration. During which DRX-wake state, the wireless device 106a, 106b is configured to receive the second cellular communication grant.

When the first period of time t1 is expired, the activating circuit 304 may further be configured to activate a short DRX cycle, $c_{S,\,cell}$, for the cellular DRX configuration. The short DRX cycle $c_{S,\,cell}$ may be repeated for a third period of time t3. Further, the short DRX cycle may comprise a first number of subframes, wherein the wireless device 106a, 106b may be in the DRX-wake state in at least one subframe of the first number of subframes, and wherein the wireless device 106a, 106b is in a DRX-sleep state when not in the DRX-wake state. When the wireless device 106a, 106b is in the DRX-wake state, the wireless device 106a, 106b is configured to receive cellular communication.

When the third period of time t3 is expired, the activating circuit 304 may further be configured to activate a long DRX cycle $c_{L,\,cell}$ for the cellular DRX configuration. The long DRX cycle $c_{L,\,cell}$ may comprise a second number of subframes, wherein the second number of subframes is larger than the first number of subframes, wherein the wireless device 106a, 106b is in the DRX-wake state in at least one subframe of the second number of subframes, and wherein the wireless device 106a, 106b is in the DRX-sleep state when not in the DRX-wake state. When the wireless device 106a, 106b is in the DRX-wake state, the wireless device 106a, 106b is configured to receive cellular communication.

When the second period of time t2 is expired, the activating circuit 304 may further be configured to activate a short DRX cycle $c_{S,\,D2D}$ for the D2D DRX configuration. The short DRX cycle $c_{S,\,D2D}$ may be repeated for a fourth period of time t4, which short DRX cycle comprises a first number of subframes. The wireless device 106a, 106b may be in the DRX-wake state in at least one subframe of the first number of subframes and in a DRX-sleep state when not in the DRX-wake state. When the wireless device 106a, 106b is in the DRX-wake state, the wireless device 106a,106b is configured to receive D2D communication.

When the fourth period of time t4 is expired, the activating circuit 304 may further be configured to activate a long DRX cycle $c_{L,\,D2D}$ for the D2D DRX configuration. The long DRX cycle $c_{L,\,D2D}$ may comprise a second number of subframes, which second number of subframes is larger than the first number of subframes. Further, for the long DRX cycle $c_{L,\,D2D}$, the wireless device 106a, 106b may be in the DRX-wake state in at least one subframe of the second number of subframes and in the DRX-sleep state when not in the DRX-wake state. When the wireless device 106a, 106b is in the DRX-wake state, the wireless device 106a, 106b is configured to receive D2D communication.

When the scheduling request comprises a request for an uplink cellular communication, the activating circuit 304 may further be configured to activate the DRX-wake state for the cellular DRX configuration. During which DRX-wake state the wireless device 106a, 106b may be configured to receive the first uplink cellular communication grant from the radio network node 104. The activating circuit 304 may activate the DRX-wake state for the cellular DRX configuration until the wireless device 106a, 106b, e.g. the receiving circuit 302, has received the first uplink cellular communication grant. In some embodiments, the activating circuit 304 may activate the DRX-wake state for the cellular DRX configuration for a fifth period of time t5. In such embodiments, the activating circuit 304 may activate the DRX-sleep state when the fifth period of time t5 has expired.

It should be understood that in some embodiments herein, the activating circuit 304 may be configured to comprise or to realize the one or more timers mentioned herein.

The wireless device 106a, 106b may further comprise a filtering circuit 305 configured to filter the cellular DRX configuration with a first subframe configuration. By filtering the cellular DRX configuration with the first subframe configuration, the wireless device 106a, 106b will be in a DRX-sleep state for cellular communication for subframes comprised in the first subframe configuration.

In some embodiments, the first subframe configuration is a D2D dedicated subframe configuration comprising one or more subframes dedicated for D2D communication.

The filtering circuit 305 may be configured to filter the D2D DRX configuration with a second subframe configuration, whereby the wireless device 106a, 106b will be in a DRX-sleep state for D2D communication for subframes comprised in the second subframe configuration.

In some embodiments, the second subframe configuration is a cellular dedicated subframe configuration comprising one or more subframes dedicated for cellular communication.

As previously mentioned, the filtering will be described in more detail below with reference to FIG. 10.

Embodiments herein for controlling Discontinuous Reception (DRX) in the wireless device 106a, 106b may be implemented through one or more processors, such as a processing circuit 306 in the wireless device 106a,106b depicted in FIG. 3, together with computer program code for performing the functions and/or method actions of embodiments herein.

It should be understood that one or more of the circuits comprised in the wireless device 106a, 106b described above may be integrated with each other to form an integrated circuit.

The wireless device 106a, 106b may further comprise a memory 307. The memory may comprise one or more memory units and may be used to store for example data such as thresholds, predefined or pre-set information, etc.

Actions described above with reference to FIG. 1B will be described below from a perspective of the radio network node 104.

Figure 4:
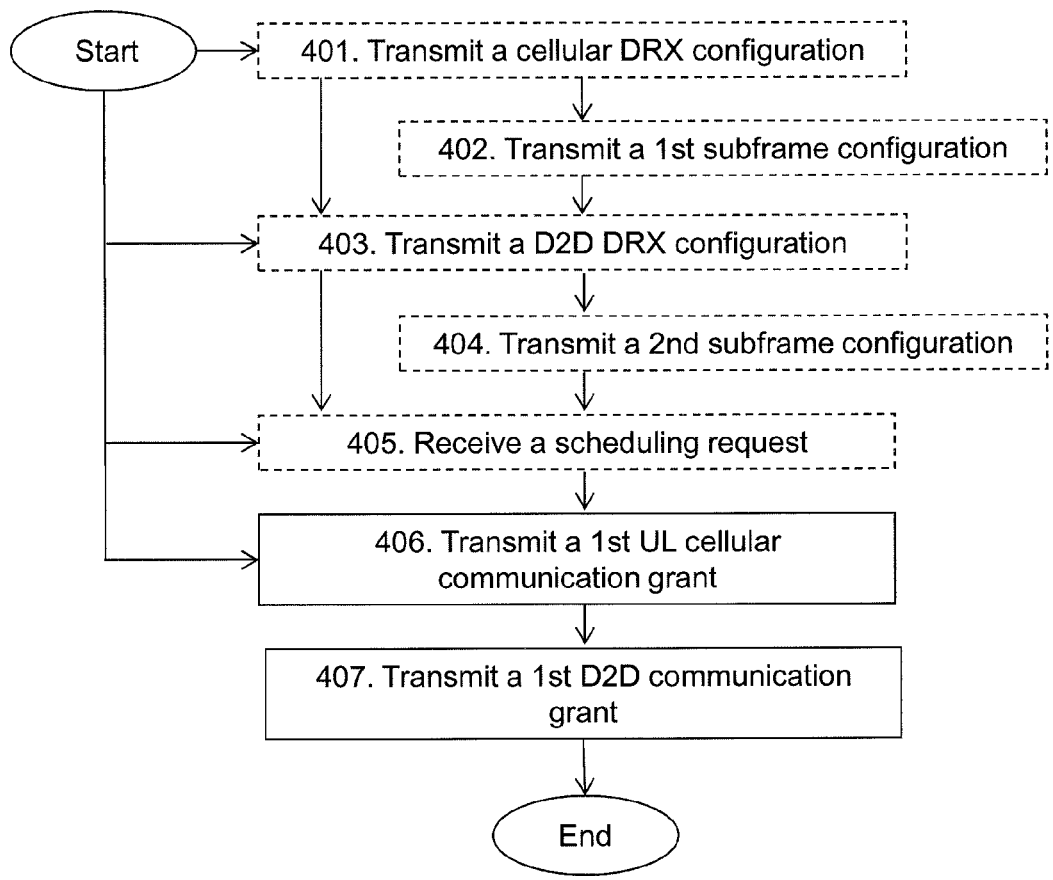
FIG. 4 is a flowchart depicting embodiments of a method in a radio network node.

A method in a radio network node 104 for controlling Discontinuous Reception (DRX) in the wireless device 106a, 106b will now be described with reference to FIG. 4. As previously mentioned, the wireless device 106a, 106b is capable of cellular communication and Device to Device (D2D) communication. Further, the wireless device 106a, 106b is served by the radio network node 104. The wireless device 106a, 106b and the radio network node 104 are comprised in a communications network 100, which communications network 100 is configured for both cellular communication and D2D communication.

The method comprises the following actions, which do not have to be performed in the order stated below, but may be taken in any suitable order. Further, actions may be combined.

Action 401

The radio network node 104 may transmit a cellular DRX configuration for scheduling of cellular communication to the wireless device 106a, 106b. This may be done in order to inform the wireless device 1906a, 106b about e.g. subframes in which the wireless device 106a, 106b should be capable of receiving cellular scheduling information from the radio network node 104.

The radio network node 104 may transmit the cellular DRX configuration to the wireless device 106a, 106b via broadcast signalling and/or dedicated signalling.

This Action relates to Action 110 described above.

Action 402

The radio network node 104 may transmit a first subframe configuration to the wireless device 106a, 106b. By means of the first subframe configuration, the wireless device 106a, 106b may filter the cellular DRX configuration such that the wireless device 106a, 106b is in a DRX-sleep state for cellular communication for subframes comprised in the first subframe configuration. As previously mentioned, the filtering will be described in more detail below with reference to FIG. 10.

The first subframe configuration may be a D2D dedicated subframe configuration comprising one or more subframes dedicated for D2D communication.

The radio network node 104 may transmit the first subframe configuration to the wireless device 106a, 106b via broadcast signalling and/or dedicated signalling.

This Action relates to Action 111 described above.

Action 403

The radio network node 104 may transmit a D2D DRX configuration for scheduling of D2D communication to the wireless device 106a, 106b. This may be done in order to inform the wireless device 1906a, 106b about e.g. subframes in which the wireless device 106a, 106b should be capable of receiving D2D scheduling information from the radio network node 104.

The radio network node 104 may transmit the D2D DRX configuration to the wireless device 106a, 106b via broadcast signalling and/or dedicated signalling. This Action relates to Action 113 described above.

Action 404

The radio network node 104 may transmit a second subframe configuration to the wireless device 106a, 106b. By means of the second subframe configuration, the wireless device 106a, 106b may filter the D2D DRX configuration such that the wireless device 106a, 106b is in a DRX-sleep state for D2D communication for subframes comprised in the second subframe configuration. As previously mentioned, the filtering will be described in more detail below with reference to FIG. 10.

The second subframe configuration may be a cellular dedicated subframe configuration comprising one or more subframes dedicated for cellular communication.

The radio network node 104 may transmit the second subframe configuration to the wireless device 106a, 106b via broadcast signalling and/or dedicated signalling.

This Action relates to Action 114 described above.

Action 405

The radio network node 104 may receive a scheduling request from the wireless device 106a, 106b.

The radio network node 104 may receive the scheduling request from the wireless device 106a,106b via UCI, MAC CE or RRC signalling.

This Action relates to Action 116 described above.

Action 406

The radio network node 104 transmits a first uplink cellular communication grant to the wireless device 106a, 106b.

The radio network node 104 may transmit the uplink cellular communication grant to the wireless device 106a, 106b via DCI.

The first uplink cellular communication grant activates the wireless device 106a, 106b to become in a DRX-wake state for a cellular DRX configuration for a first period of time t1, whereby the wireless device 106a, 106b is configured to receive a second uplink cellular communication grant during the DRX-wake.

In some embodiments, the first uplink cellular communication grant is transmitted in response the received scheduling request mentioned in Action 405.

This Action relates to Action 117 described above.

Action 407

The radio network node 104 transmits a first D2D communication grant to the wireless device 106a, 106b.

The radio network node 104 mat transmit the D2D communication grant to the wireless device 106a,106b via DCI, MAC CE or sRRC signalling.

The first D2D communication grant activates the wireless device 106a, 106b to become in a DRX-wake state for a D2D DRX configuration for a second period of time t2.

Further, the D2D DRX configuration is separate from the cellular DRX configuration.

Furthermore, the wireless device 106a,106b is configured to receive a second D2D communication grant during the DRX-wake state.

In some embodiments, the first D2D communication grant is transmitted in response the received scheduling request mentioned in Action 405.

This Action relates to Action 117 described above.

It should be understood that in some embodiments herein, the Actions 406 and 407 may be combined into a single action. In such embodiments, the radio network node 104 may transmit a single communication grant to the wireless device 106a, 106b, which single communication grant comprises the cellular communication grant and the D2D communication grant.

Figure 5:
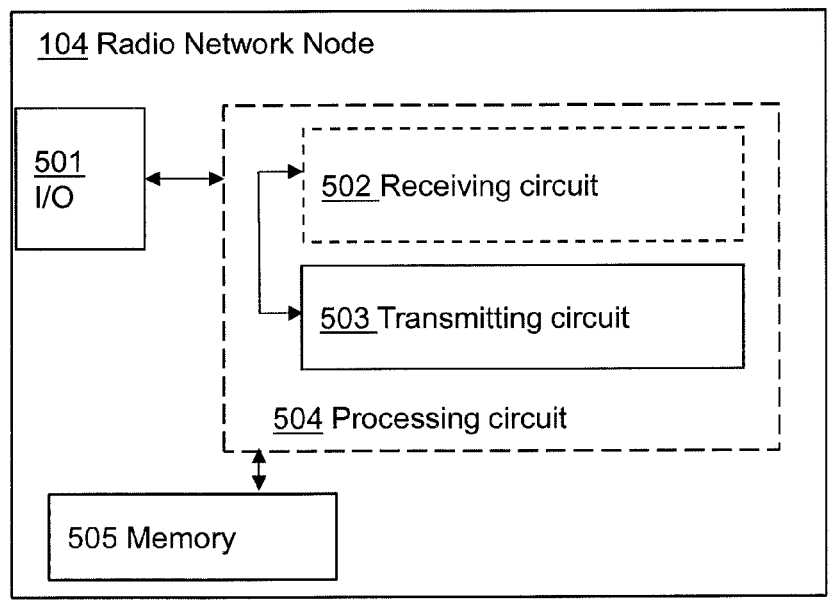
FIG. 5 is a schematic block diagram illustrating embodiments of a radio network node.

To perform the method actions in the radio network node 104 described above in relation to FIG. 4, the radio network node 104 may comprise the following arrangement depicted in FIG. 5. As previously mentioned, the wireless device 106a, 106b is capable of cellular communication and Device to Device (D2D) communication. Further, the wireless device 106a, 106b is served by the radio network node 104. The wireless device 106a, 106b and the radio network node 104 are comprised in the communications network 100, which communications network 100 is configured for both cellular communication and D2D communication.

The radio network node 104 comprises an input and output (I/O) interface 501 configured to function as an interface for communication in the communication system 100. The communication may for example be communication with the cellular radio network node 102a, 102b, another the radio network node 104, and/or the wireless device 106a, 106b.

The radio network node 104 may comprise a receiving circuit 502 configured to receive a scheduling request from the wireless device 106a, 106b.

The radio network node 104 comprises a transmitting circuit 503 configured to transmit a first uplink cellular communication grant to the wireless device 106a, 106b. The first uplink cellular communication grant activates the wireless device 106a, 106b to become in a DRX-wake state for a cellular DRX configuration for a first period of time t1, whereby the wireless device 106a, 106b is configured to receive a second uplink cellular communication grant during the DRX-wake state.

Further, the transmitting circuit 503 is configured to transmit a first D2D communication grant to the wireless device 106a, 106b. The first D2D communication grant activates the wireless device 106a, 106b to become in a DRX-wake state for a D2D DRX configuration for a second period of time t2. The D2D DRX configuration is separate from the cellular DRX configuration. Further, the wireless device 106a, 106b may be configured to receive a second D2D communication grant during the DRX-wake state.

In some embodiments, the transmitting circuit 503 is further configured to transmit the first uplink cellular communication grant and the first D2D communication grant in response to the received scheduling request.

Further, the transmitting circuit 503 may be configured to transmit the cellular DRX configuration for scheduling of cellular communication and the D2D DRX configuration for scheduling of D2D communication to the wireless device 106a, 106b.

In some embodiments, the transmitting circuit 503 is further configured to transmit a first subframe configuration to the wireless device 106a, 106b, whereby the wireless device 106a, 106b may filter the cellular DRX configuration with the first subframe configuration such that the wireless device 106a, 106b is in a DRX-sleep state for cellular communication for subframes comprised in the first subframe configuration. The first subframe configuration may be a D2D dedicated subframe configuration comprising one or more subframes dedicated for D2D communication.

In some embodiments, the transmitting circuit 503 is further configured to transmit a second subframe configuration to the wireless device 106a, 106b, whereby the wireless device 106a, 106b may filter the D2D DRX configuration with the second subframe configuration such that the wireless device 106a, 106b is in a DRX-sleep state for D2D communication for subframes comprised in the second subframe configuration. The second subframe configuration may be a cellular dedicated subframe configuration comprising one or more subframes dedicated for cellular communication.

The transmitting circuit 503 may further be configured to transmit the cellular DRX configuration, the D2D DRX configuration, first subframe configuration and/or the second subframe configuration to the wireless device 106a, 106b via broadcast signalling and/or dedicated signalling Embodiments herein for controlling Discontinuous Reception (DRX) in the wireless device 106a, 106b may be implemented through one or more processors, such as a processing circuit 504 in the radio network node 104 depicted in FIG. 5, together with computer program code for performing the functions and/or method actions of embodiments herein.

It should be understood that one or more of the circuits comprised in the radio network node 104 described above may be integrated with each other to form an integrated circuit.

The radio network node 104 may further comprise a memory 505. The memory may comprise one or more memory units and may be used to store for example data such as thresholds, predefined or pre-set information, etc.

Figure 6:
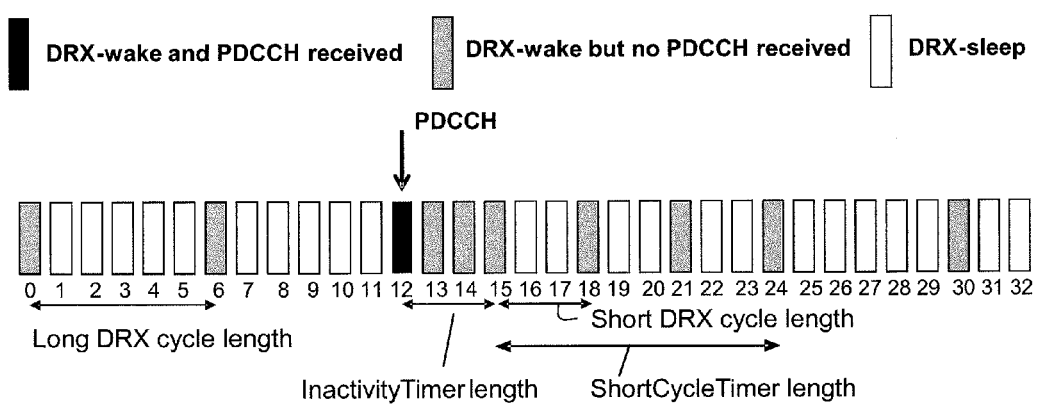
FIG. 6 is a schematic illustration of a DRX mechanism.

FIG. 6 schematically illustrates some embodiments of a DRX configuration for a wireless device 102,106. The DRX configuration may be a cellular DRX configuration or a D2D DRX configuration. As schematically illustrated, at the left-hand side of FIG. 6, a first DRX-wake state without a received PDCCH transmission is illustrated in subframe number 0 and a second DRX-wake state without a received PDCCH transmission is illustrated in subframe number 6. Further, the first and second DRX-states without a received PDCCH transmission are separated from each other by a long DRX cycle length. In FIG. 6, the long DRX cycle length is six subframes long. However, it should be understood that the long DRX cycle length may correspond to another number of subframes.

Further, as schematically illustrated in subframe number 12, a signal on the PDCCH is received. The reception of the signal may start a timer, e.g. an inactivityTimer. In the example illustrated in FIG. 6, an InactivityTimer length is set to three subframes during which three subframes the wireless device 102,106 is in a DRX-wake state, i.e. during which three subframes, i.e. subframes number 13-15, the discontinuous reception is inactivated. This may also be expressed as the wireless device is configured to receive a PDCCH transmission in the subframes number 13-15. When the InactivityTimer has reached the set InactivityTimer length, a ShortCycleTimer may be started. During a set ShortCycleTimer length of nine subframes, the wireless device 102,106 will periodically with a short DRX cycle length set to three subframes be in a DRX-wake state. When the ShortCycleTimer has reached its set ShortCycleTimer length, the wireless device 102,106 will be in the DRX-wake state according to the Long DRX cycle length until a new signal is received on the PDCCH. Upon reception of the new signal on the PDCCH, the procedure described above may be repeated.

Some advantages with two separate DRX configurations for cellular communication scheduling and D2D communication scheduling, respectively, will now be described in more detail.

Typically, the traffic characteristic for the cellular communication link is different from the traffic characteristic for the D2D communication link. For example, the traffic characteristic for the cellular communication link may be latency-critical and the traffic characteristic for the D2D communication link may be power-critical. Thus, it may be decided to use a DRX configuration to reduce latency or to save power in the wireless device. Therefore, different DRX configurations for the cellular communication link and the D2D communication link provide for flexibility to adapt to different traffic flow types.

Figure 7:
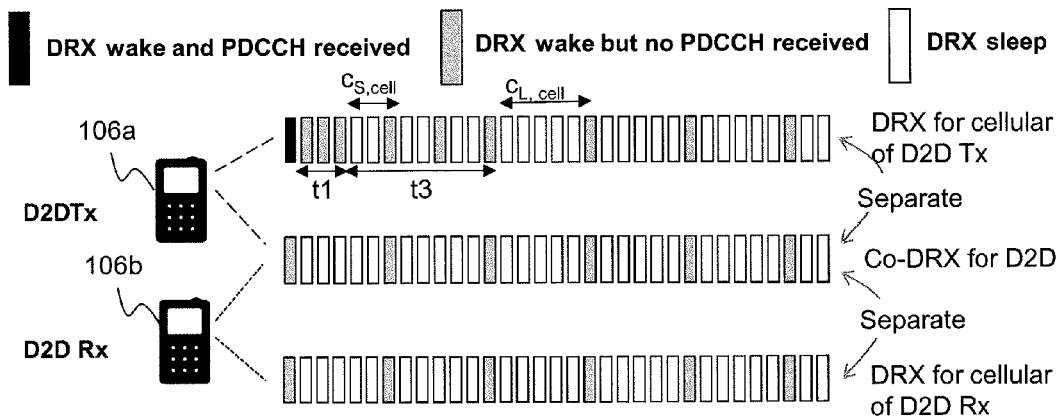
FIG. 7 is a schematic illustration of embodiments of separate DRX configurations for cellular transmissions and D2D transmission.

Further, monitoring of cellular scheduling information and of D2D scheduling information would cost two times of PDCCH blind decoding attempts, if for example different format of the DCI is used for the cellular scheduling and the D2D scheduling. Thus, a single DRX configuration used for both the cellular communication link and the D2D communication link may cause the wireless device to always try to simultaneously decode both types of scheduling information. Hence, the separate DRX configurations for the cellular communication link and the D2D communication link, respectively, provided by some embodiments described herein, may help to reduce unnecessary PDCCH decoding attempts by half. This is schematically illustrated in FIG. 7. FIG. 7 is a schematic illustration of embodiments of separate DRX configurations for cellular transmissions and D2D transmissions. The first row of FIG. 7 schematically illustrates the cellular DRX configuration for the transmitting D2D wireless device 106*a*. The second row schematically illustrates a D2D DRX configuration, in the figure referred to as a Co-DRX for D2D, which is used for D2D transmissions of both the transmitting D2D wireless device 106*a* and the receiving D2D wireless device 106*b*. However, it should be understood that the D2D DRX configuration does not have to be the same for the transmitting D2D wireless device 106*a* and the receiving D2D wireless device 106*b*, and that the transmitting D2D wireless device 106*a* and the receiving D2D wireless device 106*b* may have a respective D2D DRX configuration. The third row schematically illustrates the cellular DRX configuration for the receiving D2D wireless device 106*b*. Further, it is illustrated that the cellular DRX configurations are separate from the D2D DRX configuration.

Similarly, for the D2D communication link, there would be similar timer definition(s), e.g., onDurationTimer, short/longCycle, shortCycleTimer, inactivityTimer, which may be key components of DRX configuration, and thus define the DRX behaviour. As stated above, the specific setting of these timers for the D2D link may but not necessarily be the same as the setting for the cellular link.

Further, even though a RetransmissionTimer may be used for cellular DL transmission, this RetransmissionTimer might be still used by the D2D communication link, since it is still possible that there is a cellular DL signaling for the both D2D capable wireless devices, e.g., RRC configuration signaling for the D2D link, so the RetransmissionTimer may also be used in D2D communication.

As shown in FIG. 7, for the both D2D capable wireless devices 106*a*, 106*b*, it may be seen that the cellular DRX configuration is separate from the D2D DRX configuration, in terms that the scheduling information reception for the cellular communication link would not wake one or both of the D2D capable wireless devices to monitor D2D link scheduling information. This is schematically illustrated in the first and second rows of FIG. 7. In the first row it is illustrated that the reception of the PDCCH in subframe 0 of the DRX configuration for cellular communication of the transmitting D2D wireless device 106*a* triggers the transmitting D2D wireless device 106*a* to be in a DRX wake state for a period of time t1 corresponding to the subframes 1-3 of the cellular DRX configuration. Further, as is illustrated in the second row, the reception of the PDCCH in subframe 0 of the DRX configuration for cellular communication of the transmitting D2D wireless device 106*a* does not trigger the transmitting D2D wireless device 106*a* to be in a DRX wake state for the subframes 1-3 of the D2D DRX configuration.

According to some embodiments, a cellular scheduling request does not trigger extra active time in the D2D DRX configuration. As schematically shown in FIG. 7, even if the D2D DRX configurations of the both D2D wireless devices 106*a*, 106*b* are run independently, they may implement the same DRX timing. That means that scheduling information, e.g. DCI information, will be received by both the transmitting D2D wireless device 106*a* and the receiving D2D wireless device 106*b*. If this would not be the case, one of the transmitting D2D wireless device 106*a* and the receiving D2D wireless device 106*b* is wake while the other one of them is sleeping, which is meaningless, since the scheduling information should be received by both the transmitting D2D wireless device 106*a* and the receiving D2D wireless device 106*b* in order to schedule D2D communication.

Figure 8:
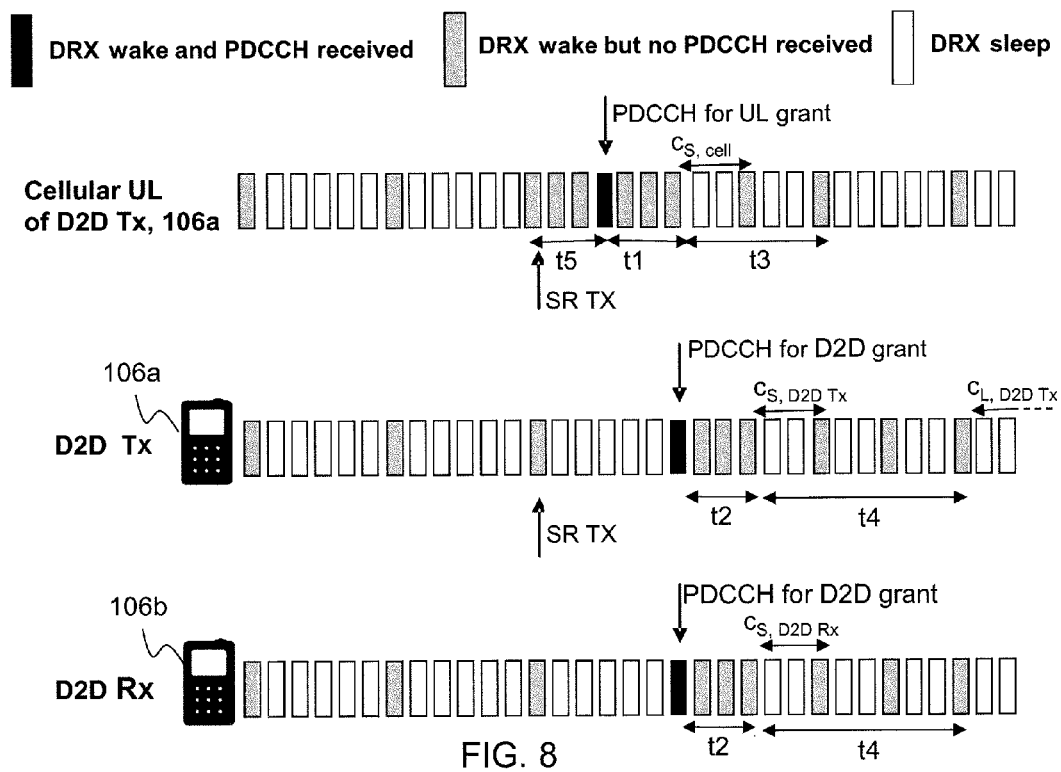
FIG. 8 is a schematic illustration of embodiments of separate DRX configurations for cellular transmissions and D2D transmission showing different behaviour after a scheduling request transmission.

FIG. 8 is a schematic illustration of embodiments of separate DRX configurations for cellular transmission and D2D transmission showing different behaviour after a scheduling request transmission (SR TX). Similar to traditional cellular UL transmission, when one side of the D2D pair, e.g. the transmitting D2D wireless device 106*a*, has data to send it may send a Scheduling Request (SR), e.g. a Dedicated Scheduling Request (D-SR), to the communications network, e.g. to the radio network node 104. The scheduling request may then be followed by continuous PDCCH monitoring by the transmitting D2D wireless device 106*a* in order to wait for an UL grant for cellular communication as soon as possible. This is schematically illustrated in the first row of FIG. 8. However, since the scheduling request is not known by the other side of the D2D pair, i.e. by the receiving D2D wireless device 106*b*, the receiving D2D wireless device 106*b* would not wake for discontinuous reception to monitor PDCCH continuously. This is also schematically illustrated in the third row of FIG. 8. Therefore, the communications network, e.g. the radio network node 104, would still follow the DRX timing of the receiving D2D wireless device 106*b* when scheduling the D2D transmission. This is schematically illustrated in the second and third rows of FIG. 8, wherein the PDCCH for D2D grant are received in the transmitting D2D wireless device 106a and the receiving D2D wireless device 106b in the same subframe.

Further, as shown in the second row of FIG. 8, the transmission of a D2D scheduling request by the transmitting D2D wireless device 106a does not change the DRX timing of the D2D DRX configuration, which is different from the traditional cellular communications network.

According to some embodiments, a D2D scheduling request may trigger extra active time in the cellular DRX configuration. In such embodiments, it may be configurable by the communications network, e.g. by the radio network node 104, to control whether the D2D scheduling may trigger active time in the cellular DRX configuration. For example, the cellular DRX inactivityTimer and/or the cellular shortCycleTimer may be triggered.

As previously mentioned, there is no way for the cellular scheduling information on a single side, e.g., at the transmitting D2D wireless device 106a, to trigger the D2D scheduling on both sides, because the other side, i.e., the receiving D2D wireless device 106b, may not receive the cellular scheduling information sent to the transmitting D2D wireless device 106a and therefore the receiving D2D wireless device 106b may not wake from the DRX sleep mode. Further, since the D2D scheduling information is sent to both the transmitting D2D wireless device 106a and the receiving D2D wireless device 106b, a scenario wherein one of them, i.e., the transmitting D2D wireless device 106a, is awake and the other one of them, the receiving D2D wireless device 106b, is asleep is as previously described meaningless and would cause unnecessary PDCCH decoding attempts at the transmitting D2D wireless device 106a.

Figure 9:
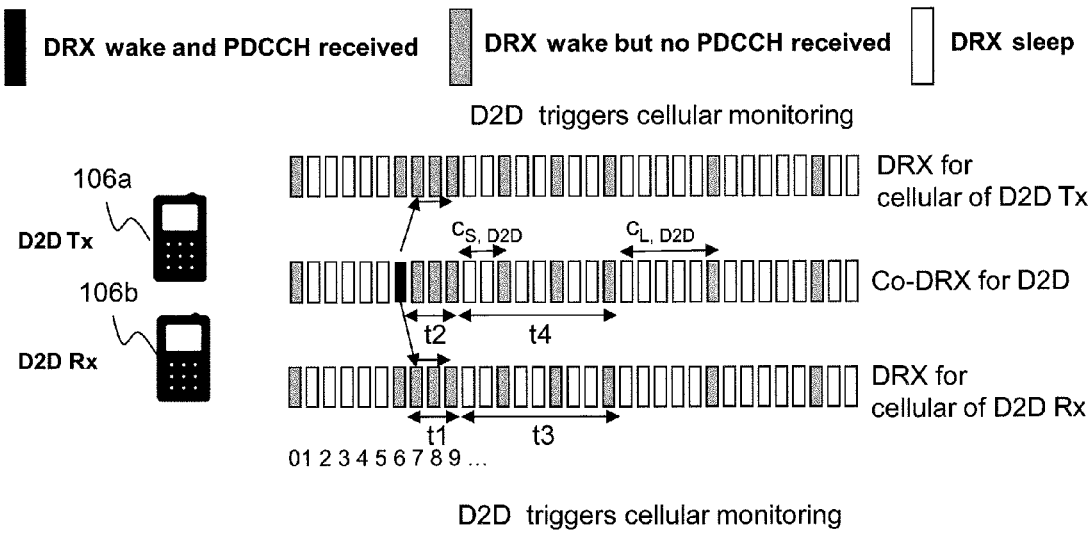
FIG. 9 is a schematic illustration of embodiments of separate DRX configurations for cellular transmissions and D2D transmission showing how D2D triggers cellular monitoring.

However, the data transmission on the D2D communication link should be supported by the cellular communication link, e.g., BSR/PHR report to eNB via UL transmission, CP data (NAS, RRC, SIP, RTCP signaling) via cellular DL/UL transmission. Thus, it may be possible that activity on the D2D communication link may trigger the activity on the cellular UL communication link and/or the cellular DL communication link. Therefore, it may help to reduce the delay, if reception of D2D scheduling information triggers scheduling monitoring for cellular DRX, i.e., it may improve the latency performance of the traffic. This is shown in FIG. 9. FIG. 9 is a schematic illustration of embodiments of separate DRX configurations for cellular transmissions and D2D transmission showing how reception of D2D scheduling information triggers cellular monitoring. The second row of FIG. 9 schematically illustrates how D2D scheduling information is received in the transmitting D2D wireless device 106a in the subframe 6. In the first and third rows it is shown how the reception of the D2D scheduling information in the transmitting D2D wireless device 106a in the subframe 6 triggers the transmitting D2D wireless device 106a and receiving D2D wireless device 106b, respectively, to be active in the subframes 7 to 9 for monitoring of cellular information.

In some embodiments, since for MAC layer signalling, i.e., BSR, PHR signalling, the cellular connection activity is mostly in the UL direction, it may be beneficial to limit the triggering relationship on UL only. That means that the wireless devices 106a may only be triggered to monitor PDCCH for UL grant, but not for DL assignment. Thereby, the number PDCCH decoding attempts for cellular connection may be reduced by two.

Further, it should be understood that whether or not the triggering or coupling should be enabled is up to the communications network 100, e.g., the radio network node 104 to decide. The decision may be based on whether or not there is a high degree of interaction between cellular connection activity and D2D connection activity.

Furthermore, the communications network 100, e.g., the radio network node 104, may signal it decision to the wireless device by means of RRC signalling specific for the wireless device.

Filtering of the cellular DRX configuration and/or the D2D DRX configuration will now be described in more detail with reference to FIG. 10. FIG. 10 is a schematic illustration of embodiments of separate DRX configurations for cellular and D2D transmissions showing how the DRX configurations may be filtered by subframe configurations. It is possible that not all the subframes may be used and/or reused by the cellular wireless devices 102a, 102b and the D2D wireless devices 106a, 106b. This may for example be the case when a scheduler or the like want to divide the whole subframe set into two sub-sets, one sub-set for cellular wireless devices 102a, 102b and one sub-set for D2D wireless devices 106a, 106b, in order to avoid the inter-system interference in-between. Besides, the D2D wireless device 106a, 106b has a choice to be scheduled in a cellular communication mode and/or a D2D communication mode. For example, in some subframes, e.g. cellular-only subframes, only cellular wireless devices 102a, 102b are to be scheduled, so the D2D wireless devices 106a, 106b do not have to monitor D2D scheduling information, e.g. D2D DCI, in those subframes. This means that the D2D DRX configuration for the D2D wireless device 106a, 106b does not have to be active in those cellular-only subframes. Correspondingly, in some subframes, e.g. D2D-only subframes, only D2D wireless devices 106a, 106b are to be scheduled, so the cellular wireless devices 102a, 102b do not have to monitor cellular scheduling information, e.g. cellular DCI, in those subframes. This means that the cellular DRX configuration for the cellular wireless device 102a, 102b does not have to be active in those D2D-only subframes.

As described above in relation to e.g. Actions 202 and 203, the cellular DRX configuration may be filtered by a first subframe configuration. The first subframe configuration may comprise subframes for which the cellular DRX configuration should not be awake to monitor PDCCH for cellular scheduling information. In some embodiments, the first subframe configuration is a D2D-only subframe configuration comprising subframes wherein only D2D wireless devices 106a, 106b are to be awake to monitor PDCCH for D2D scheduling information.

Further, as described in relation to e.g. Actions 205 and 206 above, the D2D DRX configuration may be filtered by a second subframe configuration. The second subframe configuration may comprise subframes for which the D2D DRX configuration should not be awake to monitor PDCCH for D2D scheduling information. In some embodiments, the second subframe configuration is a cellular-only subframe configuration comprising subframes wherein only cellular wireless devices 102a, 102b are to be awake to monitor PDCCH for cellular scheduling information.

In FIG. 7 no assumptions on cellular dedicated subframes and/or D2D dedicated subframes are made. That means that all subframes may be reused by all cellular wireless devices 102a, 102b and all D2D wireless devices 106a, 106b. However, FIG. 10 gives an example of how the cellular dedicated subframe configuration and the D2D dedicated subframe configuration may affect the DRX configurations.

The cellular dedicated subframe configuration is herein sometimes also referred to as a cellular-only subframe configuration, and the D2D dedicated subframe configuration is herein sometimes also referred to as a D2D-only subframe configuration.

Figure 10:
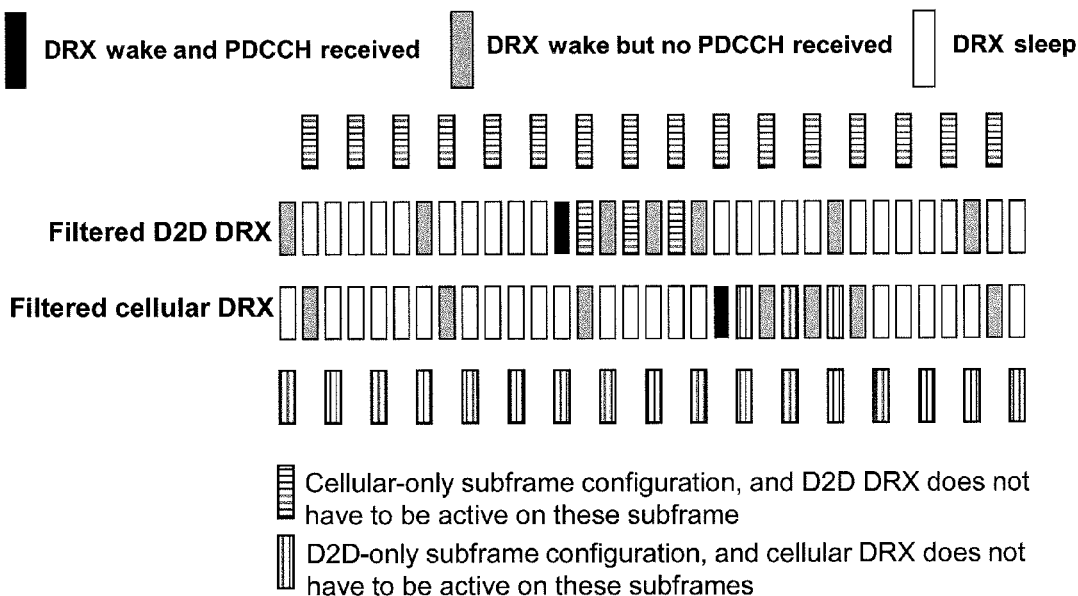
FIG. 10 is a schematic illustration of embodiments of separate DRX configurations for cellular transmissions and D2D transmission showing how the DRX configurations may be filtered by subframe configurations.

In the first and fourth rows of FIG. 10, a cellular dedicated subframe configuration and a D2D dedicated subframe configuration, respectively, are schematically illustrated. The second row schematically illustrates the D2D DRX configuration filtered with the cellular-only subframe configuration, and the third row schematically illustrates the cellular DRX configuration filtered with the D2D-only subframe configuration.

If the D2D DRX configuration was not filtered, e.g., not filtered by the cellular-only subframe configuration, there would be a continuous DRX wake-state, e.g., a DRX wake-state for six subframes following the subframe wherein the PDCCH was received according to the example of FIG. 10. However, as illustrated in the second row of FIG. 10, when the D2D DRX configuration is filtered, it will be in a DRX wake-state for only three of the six subframes following the subframe wherein the PDCCH was received. It should be noted that the specific numbers here, i.e., three, and six, are only given as examples and depend on the specific setting of DRX configuration.

Correspondingly, if the cellular DRX configuration was not filtered, e.g., not filtered by the D2D-only subframe configuration, there would be a continuous DRX wake-state, e.g., a DRX wake-state for six subframes following the subframe wherein the PDCCH was received according to the example of FIG. 10. However, as illustrated in the third row of FIG. 10, when it is filtered, it will be in a DRX wake-state for only three of the six subframes following the subframe wherein the PDCCH was received. It should be noted that the specific numbers here, i.e., three, and six, are only given as examples and depend on the specific setting of DRX configuration.

Some embodiments described herein comprise an interaction of the filtering operation and a DRX related timer, e.g., the inactivityTimer, and/or the onDurationTimer. In such embodiments, there may be two types of choices. Firstly, one or more of the timers may be running when the current subframe configuration, i.e. the cellular DRX configuration or the D2D DRX configuration, should be filtered. Secondly, one or more of the timers may pause for one subframe when the current subframe configuration should be filtered. For the first case, the total time length is kept the same, but the real active time is less than for the second case.

Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of consist at least of.

When using the word action/actions it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described examples. Various alternatives, modifications and equivalents may be used. Therefore, the above examples should not be taken as limiting the scope of the invention, which is defined by the appending claims.

The invention claimed is:

1. A method in a wireless device for controlling Discontinuous Reception (DRX) in the wireless device, wherein the wireless device is capable of cellular communication and Device to Device (D2D) communication, wherein the wireless device is served by a radio network node, wherein the wireless device and the radio network node are comprised in a communications network configured for both cellular communication and D2D communication, and wherein the method comprises:

in response to receiving a first uplink cellular communication grant, activating for a first period of time (t1) a DRX-wake state for a cellular DRX configuration during which DRX-wake state the wireless device is configured to receive a second uplink cellular communication grant;

in response to receiving a first D2D communication grant, activating for a second period of time (t2) the DRX-wake state for a D2D DRX configuration, wherein the D2D DRX configuration is separate from the cellular DRX configuration, and during which DRX-wake state the wireless device is configured to receive a second D2D communication grant;

in response to an expiration of t1, activating a short DRX cycle ($c_{S,\ cell}$) for the cellular DRX configuration, wherein the $c_{S,\ cell}$ is repeated for a third period of time (t3) wherein the $c_{S,\ cell}$ comprises a first number of subframes, wherein the wireless device is in the DRX-wake state in at least one subframe of the first number of subframes, and wherein the wireless device is in a DRX-sleep state when not in the DRX-wake state; and in response to an expiration of t3, activating a long DRX cycle ($c_{L,\ cell}$) for the cellular DRX configuration, wherein the $c_{L,\ cell}$ comprises a second number of subframes, wherein the second number of subframes is larger than the first number of subframes, wherein the wireless device is in the DRX-wake state in at least one subframe of the second number of subframes, and wherein the wireless device is in the DRX-sleep state when not in the DRX-wake state, wherein the wireless device is capable of controlling DRX using both the cellular DRX configuration and the D2D DRX configuration.

2. The method of claim 1, further comprising:

in response to receiving the first D2D communication grant, activating for t2 the DRX-wake state for the cellular DRX configuration during which DRX-wake state the wireless device is configured to receive an uplink cellular communication grant.

3. The method of claim 1, further comprising:

filtering the cellular DRX configuration with a first subframe configuration, wherein the wireless device is in a DRX-sleep state for cellular communication for subframes comprised in the first subframe configuration.

4. The method of claim 3, wherein the first subframe configuration is a D2D dedicated subframe configuration comprising one or more subframes dedicated for D2D communication.

5. The method of claim 1, further comprising:
filtering the D2D DRX configuration with a second subframe configuration, wherein the wireless device is in a DRX-sleep state for D2D communication for subframes comprised in the second subframe configuration.

6. The method of claim 5, wherein the second subframe configuration is a cellular dedicated subframe configuration comprising one or more subframes dedicated for cellular communication.

7. The method of claim 1, further comprising,
in response to an expiration of t2, activating a short DRX cycle ($c_{S,\ D2D}$) for the D2D DRX configuration, wherein the $c_{S,\ D2D}$ is repeated for a fourth period of time (t4), wherein the $c_{S,\ D2D}$ comprises a third number of subframes, wherein the wireless device is in the DRX-wake state in at least one subframe of the third number of subframes, and wherein the wireless device is in a DRX-sleep state when not in the DRX-wake state; and
in response to an expiration of t4, activating a long DRX cycle ($c_{L,\ D2D}$) for the D2D DRX configuration, wherein the $c_{L,\ D2D}$ comprises a fourth number of subframes, wherein the fourth number of subframes is larger than the third number of subframes, wherein the wireless device is in the DRX-wake state in at least one subframe of the fourth number of subframes, and wherein the wireless device is in the DRX-sleep state when not in the DRX-wake state.

8. The method of claim 1, further comprising:
receiving the first uplink cellular communication grant and the first D2D communication grant from the radio network node.

9. The method of claim 8, further comprising:
transmitting a scheduling request to the radio network node, and wherein receiving the first uplink cellular communication grant and the first D2D communication grant from the radio network node further comprises:
receiving the first uplink cellular communication grant and the first D2D communication grant in response to the transmitted scheduling request.

10. The method of claim 9, further comprising:
in response to determining the scheduling request comprises a request for an uplink cellular communication, activating for a fifth period of time (t5) the DRX-wake state for the cellular DRX configuration during which DRX-wake state the wireless device is configured to receive the first uplink cellular communication grant from the radio network node.

11. The method of claim 1, further comprising:
receiving from the radio network node the cellular DRX configuration for scheduling of cellular communication; and
receiving from the radio network node the D2D DRX configuration for scheduling of D2D communication.

12. A wireless device for controlling Discontinuous Reception (DRX) in the wireless device, wherein the wireless device is capable of cellular communication and Device to Device (D2D) communication, wherein the wireless device is served by a radio network node, wherein the wireless device and the radio network node are comprised in a communications network configured for both cellular communication and D2D communication, and wherein the wireless device comprises:
an activating circuit configured to activate, for a first period of time (t1) a DRX-wake state for a cellular DRX configuration when a first uplink cellular communication grant is received, during which DRX-wake state the wireless device is configured to receive a second uplink cellular communication grant;
the activating circuit further is configured to activate, for a second period of time (t2) the DRX-wake state for a D2D DRX configuration when a first D2D communication grant is received, wherein the D2D DRX configuration is separate from the cellular DRX configuration, and during which DRX-wake state the wireless device is configured to receive a second D2D communication grant;
the activating circuit further is configured to activate a short DRX cycle ($c_{S,\ cell}$) for the cellular DRX configuration when t1 has expired, wherein the $c_{S,\ cell}$ is repeated for a third period of time (t3), wherein the short DRX cycle comprises a first number of subframes, wherein the wireless device is in the DRX-wake state in at least one subframe of the first number of subframes, and wherein the wireless device is in a DRX-sleep state when not in the DRX-wake state; and
the activating circuit further is configured to activate a long DRX cycle ($c_{L,\ cell}$) for the cellular DRX configuration when t3 has expired, wherein the $c_{L,\ cell}$ comprises a second number of subframes, wherein the second number of subframes is larger than the first number of subframes, wherein the wireless device is in the DRX-wake state in at least one subframe of the second number of subframes, and wherein the wireless device is in the DRX-sleep state when not in the DRX-wake state,
wherein the wireless device is capable of controlling DRX using both the cellular DRX configuration and the D2D DRX configuration.

13. The wireless device of claim 12, wherein the activating circuit further is configured to activate, for t2, the DRX-wake state for the cellular DRX configuration when the first D2D communication grant is received, during which DRX-wake state the wireless device is configured to receive an uplink cellular communication grant.

14. The wireless device of claim 12, further comprising:
a filtering circuit configured to filter the cellular DRX configuration with a first subframe configuration, wherein the wireless device is in a DRX-sleep state for cellular communication for subframes comprised in the first subframe configuration.

15. The wireless device of claim 14, wherein the first subframe configuration is a D2D dedicated subframe configuration comprising one or more subframes dedicated for D2D communication.

16. The wireless device of claim 12, further comprising:
a filtering circuit configured to filter the D2D DRX configuration with a second subframe configuration, wherein the wireless device is in a DRX-sleep state for D2D communication for subframes comprised in the second subframe configuration.

17. The wireless device of claim 16, wherein the second subframe configuration is a cellular dedicated subframe configuration comprising one or more subframes dedicated for cellular communication.

18. The wireless device of claim 12, wherein
the activating circuit further is configured to activate a short DRX cycle ($c_{S,\ D2D}$) for the D2D DRX configuration when t2 has expired, wherein the $c_{S,\ D2D}$ is repeated for a fourth period of time (t4), wherein the short DRX cycle comprises a third number of subframes, wherein the wireless device is in the DRX-wake state in at least one subframe of the third number of subframes, and wherein the wireless device is in a DRX-sleep state when not in the DRX-wake state; and wherein the activating circuit further is configured to activate a long DRX cycle ($c_{L,\ D2D}$) for the D2D DRX configuration when t4 has expired, wherein the $c_{L,\ D2D}$ comprises a fourth number of subframes, wherein the fourth number of subframes is larger than the third number of subframes, wherein the wireless device is in the DRX-wake state in at least one subframe of the fourth number of subframes, and wherein the wireless device is in the DRX-sleep state when not in the DRX-wake state.

19. The wireless device of claim 12, further comprising:
a receiving circuit configured to receive the first uplink cellular communication grant and the first D2D communication grant from the radio network node.

20. The wireless device of claim 19, further comprising:
a transmitting circuit configured to transmit a scheduling request to the radio network node, and wherein the receiving circuit further is configured to receive the first uplink cellular communication grant and the first D2D communication grant in response to the transmitted scheduling request.

21. The wireless device of claim 20, wherein the activating circuit further is configured to activate, for a fifth period of time (t5), the DRX-wake state for the cellular DRX configuration when the scheduling request comprises a request for an uplink cellular communication, during which DRX-wake state the wireless device is configured to receive the first uplink cellular communication grant from the radio network node.

22. The wireless device of claim 12, further comprising:
a receiving circuit configured to receive from the radio network node the cellular DRX configuration for scheduling of cellular communication; and wherein
the receiving circuit further is configured to receive from the radio network node the D2D DRX configuration for scheduling of D2D communication.

23. A method in a radio network node for controlling Discontinuous Reception (DRX) in a wireless device, wherein the wireless device is capable of cellular communication and Device to Device (D2D) communication, wherein the radio network node and the wireless device are comprised in a communications network configured for both cellular communication and D2D communication, and wherein the method comprises:

transmitting a first uplink cellular communication grant to the wireless device, wherein the first uplink cellular communication grant activates the wireless device to be in a DRX-wake state for a cellular DRX configuration for a first period of time (t1), wherein the wireless device is configured to receive a second uplink cellular communication grant during the DRX-wake, and in response to an expiration of t1, the wireless device activates a short DRX cycle ($c_{S,\ cell}$) for the cellular DRX configuration, wherein the $c_{S,\ cell}$ is repeated for a third period of time (t3) wherein the $c_{S,\ cell}$ comprises a first number of subframes, wherein the wireless device is in the DRX-wake state in at least one subframe of the first number of subframes, and wherein the wireless device is in a DRX-sleep state when not in the DRX-wake state, and in response to an expiration of t3, the wireless device activates a long DRX cycle ($c_{L,\ cell}$) for the cellular DRX configuration, wherein the $c_{L,\ cell}$ comprises a second number of subframes, wherein the second number of subframes is larger than the first number of subframes, wherein the wireless device is in the DRX-wake state in at least one subframe of the second number of subframes, and wherein the wireless device is in the DRX-sleep state when not in the DRX-wake state; and transmitting a first D2D communication grant to the wireless device, wherein the first D2D communication grant activates the wireless device to be in a DRX-wake state for a D2D DRX configuration for a second period of time (t2), wherein the D2D DRX configuration is separate from the cellular DRX configuration, wherein the wireless device is configured to receive a second D2D communication grant during the DRX-wake state, wherein the wireless device is capable of controlling DRX the wireless device using both the cellular DRX configuration and the D2D DRX configuration.

24. The method of claim 23, further comprising:
receiving a scheduling request from the wireless device, and wherein transmitting the first uplink cellular communication grant and transmitting the first D2D communication grant to the wireless device further comprises:
transmitting the first uplink cellular communication grant and the first D2D communication grant in response to the received scheduling request.

25. The method of claim 23, further comprising:
transmitting to the wireless device the cellular DRX configuration for scheduling of cellular communication; and
transmitting to the wireless device the D2D DRX configuration for scheduling of D2D communication.

26. The method of claim 23, further comprising:
transmitting a first subframe configuration to the wireless device, wherein the wireless device filters the cellular DRX configuration with the first subframe configuration such that the wireless device is in a DRX-sleep state for cellular communication for subframes comprised in the first subframe configuration.

27. The method of claim 26, wherein the first subframe configuration is a D2D dedicated subframe configuration comprising one or more subframes dedicated for D2D communication.

28. The method of claim 23, further comprises:
transmitting a second subframe configuration to the wireless device, wherein the wireless device filters the D2D DRX configuration with the second subframe configuration such that the wireless device is in a DRX-sleep state for D2D communication for subframes comprised in the second subframe configuration.

29. The method of claim 28, wherein the second subframe configuration is a cellular dedicated subframe configuration comprising one or more subframes dedicated for cellular communication.

30. A radio network node for controlling Discontinuous Reception (DRX) in a wireless device, wherein the wireless device is capable of cellular communication and Device to Device (D2D) communication, wherein the radio network node and the wireless device are comprised in a communications network configured for both cellular communication and D2D communication, and wherein the radio network node comprises:

a transmitting circuit configured to transmit a first uplink cellular communication grant to the wireless device, wherein the first uplink cellular communication grant activates the wireless device to be in a DRX-wake state for a cellular DRX configuration for a first period of time (t1), wherein the wireless device is configured to receive a second uplink cellular communication grant during the DRX-wake state, and in response to an expiration of t1, the wireless device activates a short DRX cycle ($c_{S,\,cell}$) for the cellular DRX configuration, wherein the $c_{S,\,cell}$ is repeated for a third period of time (t3) wherein the $c_{S,\,cell}$ comprises a first number of subframes, wherein the wireless device is in the DRX-wake state in at least one subframe of the first number of subframes, and wherein the wireless device is in a DRX-sleep state when not in the DRX-wake state, and in response to an expiration of t3, the wireless device activates a long DRX cycle ($c_{L,\,cell}$) for the cellular DRX configuration, wherein the $c_{L,\,cell}$ comprises a second number of subframes, wherein the second number of subframes is larger than the first number of subframes, wherein the wireless device is in the DRX-wake state in at least one subframe of the second number of subframes, and wherein the wireless device is in the DRX-sleep state when not in the DRX-wake state; and the transmitting circuit further is configured to transmit a first D2D communication grant to the wireless device, wherein the first D2D communication grant activates the wireless device to be in a DRX-wake state for a D2D DRX configuration for a second period of time (t2), wherein the D2D DRX configuration is separate from the cellular DRX configuration, wherein the wireless device is configured to receive a second D2D communication grant during the DRX-wake state, wherein the wireless device is capable of controlling DRX using both the cellular DRX configuration and the D2D DRX configuration.

31. The radio network node of claim 30, further comprising:

a receiving circuit configured to receive a scheduling request from the wireless device; and wherein the transmitting circuit further is configured to transmit the first uplink cellular communication grant and the first D2D communication grant in response to the received scheduling request.

32. The radio network node of claim 30, wherein the transmitting circuit further is configured to transmit the cellular DRX configuration for scheduling of cellular communication and the D2D DRX configuration for scheduling of D2D communication to the wireless device.

33. The radio network node of claim 30, wherein the transmitting circuit further is configured to transmit a first subframe configuration to the wireless device, wherein the wireless device filters the cellular DRX configuration with the first subframe configuration such that the wireless device is in a DRX-sleep state for cellular communication for subframes comprised in the first subframe configuration.

34. The radio network node of claim 33, wherein the first subframe configuration is a D2D dedicated subframe configuration comprising one or more subframes dedicated for D2D communication.

35. The radio network node of claim 30, wherein the transmitting circuit further is configured to transmit a second subframe configuration to the wireless device, wherein the wireless device filters the D2D DRX configuration with the second subframe configuration such that the wireless device is in a DRX-sleep state for D2D communication for subframes comprised in the second subframe configuration.

36. The radio network node of claim 35, wherein the second subframe configuration is a cellular dedicated subframe configuration comprising one or more subframes dedicated for cellular communication.

* * * * *

UNITED STATES PATENT AND TRADEMARK OFFICE
CERTIFICATE OF CORRECTION

PATENT NO.       : 9,510,287 B2
APPLICATION NO.  : 14/388760
DATED            : November 29, 2016
INVENTOR(S)      : Lu et al.

Page 1 of 2

It is certified that error appears in the above-identified patent and that said Letters Patent is hereby corrected as shown below:

On the Title Page

In item (56), under "U.S. PATENT DOCUMENTS", in Column 2, Line 1, delete "Wang" and insert -- Wang et al. --, therefor.

In item (56), under "U.S. PATENT DOCUMENTS", in Column 2, Line 3, delete "Horneman" and insert -- Horneman et al. --, therefor.

On Page 2, in item (56), under "U.S. PATENT DOCUMENTS", in Column 1, Line 2, delete "Wang" and insert -- Wang et al. --, therefor.

On Page 2, in item (56), under "OTHER PUBLICATIONS", in Column 2, Line 2, delete "2012)" and insert -- 2012), --, therefor.

On Page 2, in item (56), under "OTHER PUBLICATIONS", in Column 2, Line 7, delete "2012)" and insert -- 2012), --, therefor.

In the Specification

In Column 6, Line 17, delete "Retransmission" and insert -- Repeat --, therefor.

In Column 7, Line 1, delete "(RTCP)" and insert -- (RTP) --, therefor.

In Column 9, Line 52, delete "Indicator" and insert -- Information --, therefor.

In Column 13, Line 37, delete "be may" and insert -- may --, therefor.

In Column 15, Lines 20-21, delete "input and output" and insert -- input/output --, therefor.

Signed and Sealed this
Sixth Day of June, 2017

Michelle K. Lee
*Director of the United States Patent and Trademark Office*

CERTIFICATE OF CORRECTION (continued)
U.S. Pat. No. 9,510,287 B2

In Column 17, Line 54, delete "1906a, 106b" and insert -- 106a, 106b --, therefor.

In Column 18, Line 16, delete "1906a, 106b" and insert -- 106a, 106b --, therefor.

In Column 19, Line 3, delete "sRRC" and insert -- RRC --, therefor.

In Column 19, Lines 34-35, delete "input and output" and insert -- input/output --, therefor.

In Column 23, Line 36, delete "RTCP" and insert -- RTP --, therefor.

In the Claims

In Column 27, Line 11, in Claim 7, delete "comprising," and insert -- comprising: --, therefor.